(12) United States Patent
Bui et al.

(10) Patent No.: US 10,769,495 B2
(45) Date of Patent: Sep. 8, 2020

(54) COLLECTING MULTIMODAL IMAGE EDITING REQUESTS

(71) Applicant: Adobe Inc., San Jose, CA (US)

(72) Inventors: Trung Huu Bui, San Jose, CA (US); Zhe Lin, Fremont, CA (US); Walter Wei-Tuh Chang, San Jose, CA (US); Nham Van Le, San Jose, CA (US); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 56 days.

(21) Appl. No.: 16/052,246

(22) Filed: Aug. 1, 2018

(65) Prior Publication Data
US 2020/0042286 A1    Feb. 6, 2020

(51) Int. Cl.
| | |
|---|---|
| *G06K 9/62* | (2006.01) |
| *G06F 3/16* | (2006.01) |
| *G06F 3/0488* | (2013.01) |
| *G10L 15/06* | (2013.01) |
| *G06F 9/451* | (2018.01) |

(Continued)

(52) U.S. Cl.
CPC ......... *G06K 9/6256* (2013.01); *G06F 3/0482* (2013.01); *G06F 3/0484* (2013.01); *G06F 3/04845* (2013.01); *G06F 3/04883* (2013.01); *G06F 3/167* (2013.01); *G06F 9/451* (2018.02); *G06F 16/54* (2019.01); *G06N 3/08* (2013.01);

(Continued)

(58) Field of Classification Search
CPC ........ G06K 9/6256; G06N 20/00; G06N 3/08; G10L 15/063; G06F 3/04883; G06F 3/167; G06F 9/451; G06F 3/0484; G06F 3/04845; G06F 16/54; G06F 3/0482

See application file for complete search history.

(56) References Cited

U.S. PATENT DOCUMENTS

| | | | | |
|---|---|---|---|---|
| 5,577,186 A | * | 11/1996 | Mann, II | ................ G09B 5/065 715/203 |
| 6,748,119 B1 | * | 6/2004 | Bollman | ................... G06T 5/00 382/254 |

(Continued)

OTHER PUBLICATIONS

Gierad Laput et al, "PixelTone: A Multimodal Interface for Image Editing", Apr. 27, 2013, CHI ACM, All pages (Year: 2013).*

*Primary Examiner* — Kieu D Vu
*Assistant Examiner* — Roberto Borja
(74) *Attorney, Agent, or Firm* — SBMC

(57) ABSTRACT

In implementations of collecting multimodal image editing requests (IERs), a user interface is generated that exposes an image pair including a first image and a second image including at least one edit to the first image. A user simultaneously speaks a voice command and performs a user gesture that describe an edit of the first image used to generate the second image. The user gesture and the voice command are simultaneously recorded and synchronized with timestamps. The voice command is played back, and the user transcribes their voice command based on the playback, creating an exact transcription of their voice command. Audio samples of the voice command with respective timestamps, coordinates of the user gesture with respective timestamps, and a transcription are packaged as a structured data object for use as training data to train a neural network to recognize multimodal IERs in an image editing application.

20 Claims, 9 Drawing Sheets

(51) Int. Cl.
*G06F 3/0482* (2013.01)
*G06F 16/54* (2019.01)
*G06N 3/08* (2006.01)
*G06N 20/00* (2019.01)
*G06F 3/0484* (2013.01)

(52) U.S. Cl.
CPC ............ *G06N 20/00* (2019.01); *G10L 15/063* (2013.01); *G10L 2015/0638* (2013.01)

(56) References Cited

U.S. PATENT DOCUMENTS

| | | | |
|---|---|---|---|
| 9,794,527 B1* | 10/2017 | Balez | H04N 7/185 |
| 2003/0177108 A1* | 9/2003 | Charlesworth | G06F 16/3343 |
| 2004/0193428 A1* | 9/2004 | Fruchter | H04L 29/06 |
| | | | 704/276 |
| 2005/0159903 A1* | 7/2005 | Ogura | A61B 6/00 |
| | | | 702/40 |
| 2006/0149558 A1* | 7/2006 | Kahn | G10L 15/063 |
| | | | 704/278 |
| 2013/0222302 A1* | 8/2013 | Savard | G06F 3/0416 |
| | | | 345/173 |
| 2015/0142953 A1* | 5/2015 | Bayen | H04L 67/22 |
| | | | 709/224 |
| 2016/0239259 A1* | 8/2016 | Lenchner | G06F 3/167 |

* cited by examiner

COLLECTING MULTIMODAL IMAGE EDITING REQUESTS

BACKGROUND

Image editing applications receive image editing requests (IERs) via a user interface to edit images, such as for cropping, adjusting color, adding or removing objects, and the like. A user interface of an image editing application usually receives IERs via user selection of items exposed in the user interface. For instance, a user may select a tab in a user interface with a cursor of a mouse to apply a filter designated by the tab to an image. Furthermore, an IER may require multiple user inputs. For instance, to crop an image, a user may have to navigate to a crop tool, select the crop tool, move multiple handles of the crop tool to crop the image, and deselect the crop tool. Because the editing of images can require a large number of IERs, and an IER may require multiple user inputs, image editing with image editing applications can require significant user effort, in terms of time and input to the image editing application.

Furthermore, image editing applications do not usually accept voice commands from a user as IERs, since voice commands alone that sufficiently describe an IER request are often complex, and therefore are generally not appropriate to train a neural network for use in an image editing application to understand IERs. For instance, a user may speak an IER "Move the dog by the leg of the table from under the table" to request to move one of multiple dogs in an image. However, this voice command may be too complex to adequately train a neural network to understand the intent of the voice command, because of the number and relationships of terms in the voice command.

Some websites accept written IERs along with an image to be edited, and (for a small fee) will return an image to a user that has been edited in accordance with the submitted written IER. However, images and associated IERs from these websites are generally not appropriate to use as training data for a neural network to recognize IERs because the IERs from these websites are either highly abstract (e.g., "Please make this image more instragrammable"), or contain superfluous information to the IER about the image (e.g., "My dog Rover passed away. We used to walk every day except Sunday. Could anyone make him look like a good dog?"), or both.

Accordingly, there is a lack of appropriate data to train a neural network, machine learning algorithm, artificial intelligence model, and the like, to recognize IERs in an image editing application, so a user would not have to rely on user selection of items exposed in the user interface, such as by selecting tabs and menu items with a mouse cursor, to implement an IER. Hence, user interfaces of image editing applications remain inefficient and require significant user input to accomplish image editing tasks.

SUMMARY

Techniques, systems, and devices are described to collect multimodal IERs including a voice command and a user gesture simultaneously generated by a user. Data collected for multimodal IERs is suitable to train an adaptive model, such as a neural network, machine learning algorithm, artificial intelligence model, and the like, to recognize multimodal IERs in an image editing application. Hence, an image editing application employing an adaptive model that has been trained with data collected by the techniques, systems, and devices described herein can accept multimodal IERs in a user interface, and therefore is more efficient than image editing applications that rely on user selection of items exposed in the user interface (e.g., tab selection with a mouse cursor) to implement an IER. To collect multimodal IERs, a user interface is generated that exposes a pair of images including a first image and a second image that includes at least one edit to the first image. A user (e.g., a client on a computing device) simultaneously speaks a voice command and performs a user gesture that describe an edit of the first image used to generate the second image. For instance, a user may speak the voice command "Make this a fish" while circling with a cursor of a mouse a football in the first image that has been changed to a fish in the second image. The user gesture and the voice command are simultaneously recorded and synchronized while being recorded with timestamps. The voice command is played back, and the user transcribes their voice command based on the play back, creating an exact transcription of their voice command A recording of the voice command, a recording of the user gesture (e.g., data tuples including coordinates with respective timestamps), and a user transcription are packaged as a structured data object that can be used together with the pair of images as training data to train any suitable adaptive model to recognize multimodal IERs in an image editing application, thus reducing the amount of user effort needed to edit images in the image editing application.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
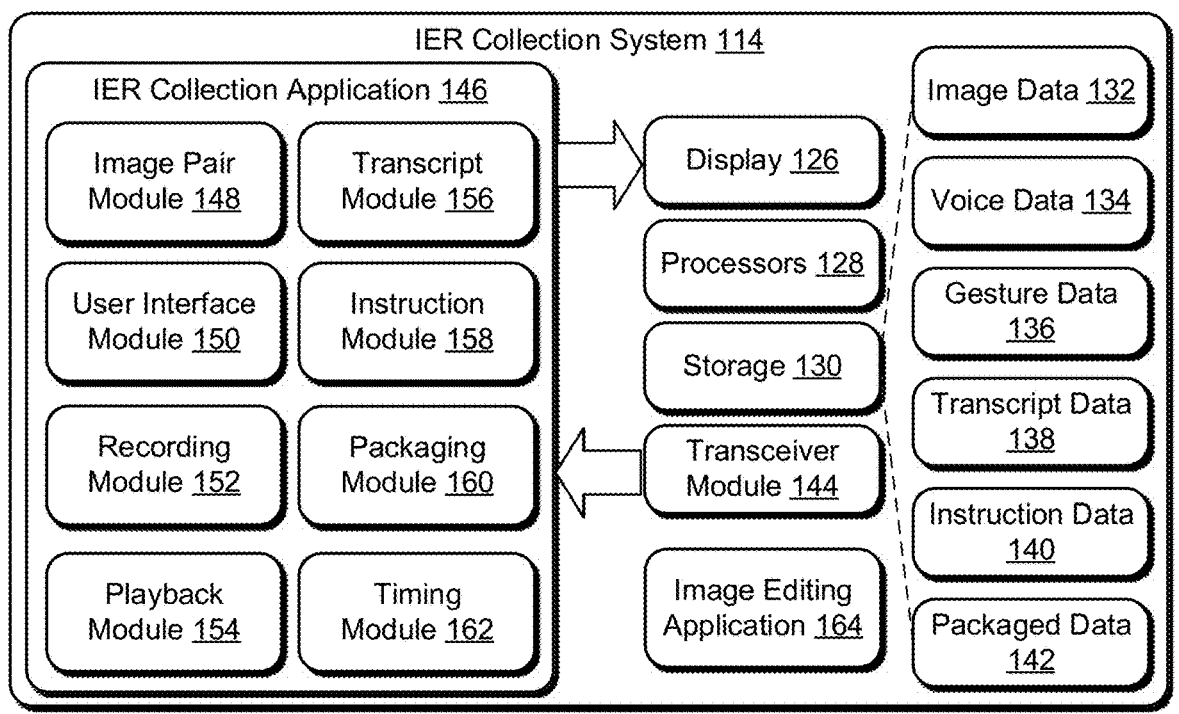
FIG. 1 illustrates a digital medium environment in an example implementation that is operable to employ techniques described herein.
Figure 1:
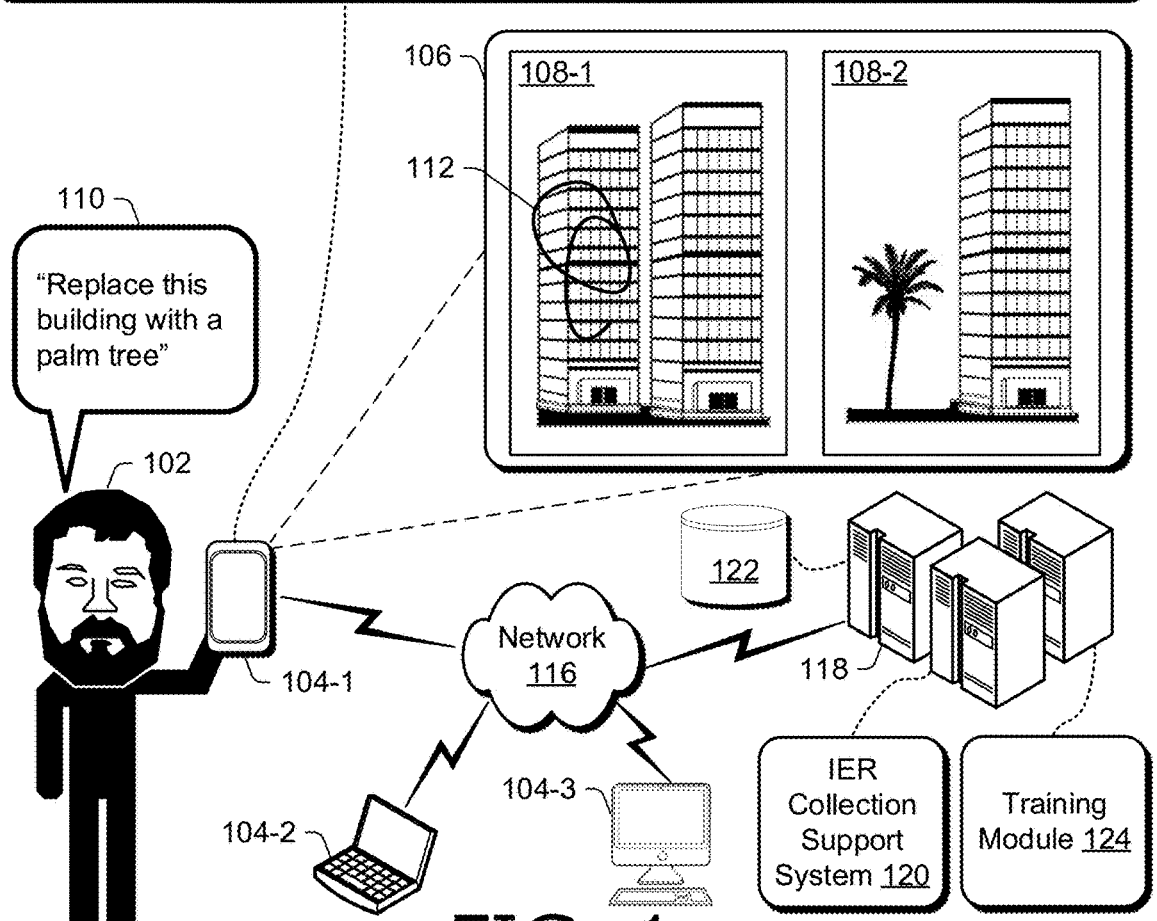

Editing of images in an image editing application can require a large number of IERs, and each IER may require multiple user inputs, requiring significant user effort to edit images in image editing applications. Furthermore, because voice commands are generally too complex to train a neural network to recognize IERs, image editing applications are not configured to receive IERs as voice commands. Moreover, written IERs gleaned from websites offering image editing services are generally not appropriate to use as training data for a neural network for recognizing IERs because the written IERs from these websites are highly abstract or contain superfluous information to the IER about the image. Consequently, there is a lack of training data for adaptive models, such as a neural network, machine learning algorithm, artificial intelligence model, and the like, to recognize IERs including voice commands in an image editing application, and image editing requires significant user input.

Accordingly, this disclosure describes systems, techniques, and devices for collecting multimodal IERs including a simultaneous user gesture and a voice command (e.g., a user simultaneously traces an outline of an object in an image with a cursor of a mouse and speaks a voice command describing an edit of the object) suitable to train an adaptive model, such as a neural network, machine learning algorithm, artificial intelligence model, and the like.

To collect multimodal IERs, a user interface is generated that exposes a pair of images including a first image and a second image that includes at least one edit to the first image. For instance, the second image is an edited version of the first image, edited in any suitable way and with any suitable number of edits. In one example, a user interface includes an option to skip a pair of images exposed in the user interface. A user interface can prompt a user for a reason a pair of images is skipped, such as to select a tab indicating "the two images are too similar" Additionally or alternatively, a user interface can include an option to expose a hint regarding a pair of images, such as by highlighting a region in one of the images where an edit has been applied responsive to a user selection of a "hint" button.

A user (e.g., a client on a computing device) simultaneously speaks a voice command and performs a user gesture based on a pair of images exposed in a user interface. The voice command and the user gesture describe an edit of the first image used to generate the second image. For instance, a user may speak the voice command "Make this a fish" while circling with a cursor of a mouse a football in the first image that has been changed to a fish in the second image. The user gesture and the voice command are simultaneously recorded and synchronized while being recorded using timestamps. In one example, a trace of a user gesture is recorded as data tuples including coordinates (e.g., Cartesian coordinates on a screen) and a timestamp for each sample of the user gesture. Additionally or alternatively, audio samples of a voice command are recorded with a timestamp. A timestamp of data tuples of a user gesture and a timestamp of audio samples of a voice command can be generated from a same clock. Hence, a user gesture and voice command may be synchronized and played back simultaneously from the recorded data tuples and audio samples, such as by tracing the path of the user gesture on a display screen while the audio samples are played back on a speaker. In one example, a voice command is played back responsive to a user selection of a play back control in a user interface, so that a user can hear their voice command.

Based on play back of a voice command (e.g., play back of an audio file including recorded audio samples of a spoken utterance including a voice command), a transcription of the voice command is generated. In one example, a user transcribes their voice command based on the play back, creating an exact transcription of their voice command which is captured in a text file. A user interface can include any suitable control to enable playback and user transcription, such as a "Play" button to cause play back of an audio file, a "Stop" button to cease play back of an audio file, a "Repeat" button to cause an audio file to be repeated, a window where a user types a transcription of an audio file, combinations thereof, and the like.

A user can enter any suitable number of multimodal IERs for a pair of images exposed in a user interface, and record voice commands, user gestures, and user transcriptions for each multimodal IER. Additionally or alternatively, a user may provide input (e.g., a user gesture, a voice command, and a user transcription of the voice command) for any suitable number of image pairs, such as at least twenty image pairs. In one example, a plurality of users are compensated (e g, financial payment) for entering multimodal IERs for image pairs and transcribing their voice commands, so that a large and diverse database of data representing multimodal IERs is collected. Accordingly, rules can be enforced to require a user to enter multimodal IERs compliant with the rules, such as by requiring a user enter a threshold of multimodal IERs, requiring a user to view a threshold number of image pairs, restricting a maximum number of image pairs that can be skipped, requiring a user to enter a reason for skipping an image pair, limiting a minimum or maximum amount of time a user can log onto a multimodal IER collection system, combinations thereof, and the like.

A recording of a voice command, a recording of a user gesture (e.g., coordinates with respective timestamps), and a user transcription are packaged as a structured data object, such as a data object suitable for storage in a relational database (e.g., a MySQL database). A structured data object may include metadata, such as a user identification, an identification of a computing device (e.g., client computing device), a length of time a user is logged on and providing multimodal IERs, combinations thereof, and the like. Structured data objects including voice commands, user gestures, and user transcriptions of the voice commands represent multimodal IERs and together with image pairs are suitable as training data to train any suitable adaptive model to recognize multimodal IERs, such as a neural network, machine learning algorithm, artificial intelligence model, and the like.

Accordingly, the systems, techniques, and devices described herein collect multimodal IERs to train an adaptive model that can be used in image editing applications, such as Photoshop®, to recognize multimodal IERs and significantly reduce the amount of user effort needed to perform image editing, in terms of user time and number of user inputs. Hence, the systems, techniques, and devices described herein provide for more efficient image editing applications than image editing applications that do not recognize multimodal IERs including voice commands and user gestures.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device, such as a client computing device (e.g., a tablet device with a touchscreen). In the example in FIG. 1, three client computing devices are illustrated, computing device 104-1, computing device 104-2, and computing device 104-3 (collectively, computing devices 104). User 102 is illustrated as operating computing device 104-1, and users of computing device 104-2 and computing device 104-3 are omitted for clarity.

Computing device 104-1 depicts a tablet, computing device 104-2 depicts a laptop computer, and computing device 104-3 depicts a desktop computer. Computing devices 104 are example computing devices, and any suitable computing device is contemplated, such as a mobile phone, tablet, laptop computer, desktop computer, gaming device, goggles, glasses, camera, digital assistant, wearable device (e.g., watch, arm-band, adhesive patch, etc.), echo device, image editor, non-linear editor, digital audio workstation, copier, scanner, and the like that may expose a user interface to collect multimodal IERs. Furthermore, discussion of one of computing devices 104 is not limited to that computing device, but generally applies to each of the computing devices 104. Moreover, computing devices 104 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104. For example, computing devices 104 can recognize input as being a mouse input, stylus input, touch input, input provided through a natural user interface (e.g., arm or hand movements determined through any suitable sensor, such as gyroscopes, cameras, etc.), user gestures on a touchscreen, combinations thereof, and the like. Thus, computing devices 104 can recognize multiple types of user gestures including touch gestures and gestures provided through a natural user interface. In one example, computing devices 104 include speech recognition, identification, and synthesis functionalities, microphones, and speakers that allow computing devices 104 to record and play back voice commands (e.g., spoken utterances by user 102 describing IERs). In one example, computing devices 104 include an image capture device (e.g., a camera) configured to capture images and video streams. Furthermore, computing devices 104 may be representative of one or a plurality of different devices, such as one or more devices connected to a network that perform operations "over the cloud" as further described in relation to FIG. 9.

Computing devices 104 expose user interfaces, and users provide data representative of multimodal IERs that is collected and stored. The data collected can be used as training data to train an adaptive model, such as a neural network, machine learning algorithm, artificial intelligence model, and the like, to recognize multimodal IERs in an image editing application. In the example illustrated in FIG. 1, computing device 104-1 generates user interface 106. User interface 106 exposes a pair of images including first image 108-1 and second image 108-2 (collectively image pair 108). Second image 108-2 is an example of a version of first image 108-1 that has been edited. For instance, first image 108-1 includes two buildings, and second image 108-2 has been generated by editing first image 108-1 by replacing the building on the left in first image 108-1 with a palm tree.

User 102 describes the editing of first image 108-1 to generate second image 108-2 by simultaneously uttering voice command 110 and performing a user gesture indicated by trace 112. For instance, trace 112 may indicate a path of a user gesture resulting from a mouse or user swipe while speaking voice command 110. Voice command 110 and trace 112 of a user gesture are recorded by IER collection system 114 to collect multimodal IERs. Accordingly, IER collection system 114 generates user interface 106 and exposes image pair 108 and trace 112 of a user gesture to collect multimodal IERs.

In the example in FIG. 1, user 102 describes the editing of first image 108-1 to generate second image 108-2 by uttering voice command 110 "Replace this building with a palm tree" while simultaneously performing a user gesture represented by trace 112. A user gesture represented by trace 112 can be generated in any suitable way, such as by circling the building, tapping on it, scribbling across it, and the like. In one example, a user gesture is detected by a camera of computing device 104-1. For instance, a camera may detect where a user points, waves, or looks at part of an image, and track a user's movement or vision to create a trace, such as trace 112. Additionally or alternatively, a user gesture represented by trace 112 can be generated with a user touch (e.g., with one or more fingers, palm, stylus, pen, etc.), a mouse, a track ball, a keyboard (e.g., with arrow keys), combinations thereof, and the like.

Because the IER is multimodal (e.g., includes both a voice command and a user gesture), user 102 does not need to provide a voice command that is overly complex, such as would be required when identifying the building to be replaced by voice command only. Instead, voice command 110 includes a relative reference to the building to be replaced (e.g., "this building"), that relates to the user gesture of trace 112. Without the user gesture of trace 112, "this building" lacks a reference and is not well defined. By using multimodal IERs including both voice commands and user gestures, voice commands collected by IER collection system 114 can be simplified compared to voice commands that alone (e.g., without a user gesture) must describe an IER. Accordingly, multimodal IERs collected by IER collection system 114 are well suited for training an adaptive model to recognize multimodal IERs in an image editing application.

In one example, user interface 106 exposes an option (not shown) to enable playback of voice command 110, so that user 102 can transcribe voice command 110 exactly. By providing a mechanism for user 102 to transcribe voice command 110, IER collection system 114 reduces the error rate in transcriptions compared to systems where a different user than user 102 may transcribe a recording of a voice command. For instance, a same user immediately after speaking a voice command is less likely to incorrectly transcribe the voice command than a different user transcribing the voice command at a different date than when the voice command was uttered.

Computing devices 104 are also coupled to network 116. Network 116 communicatively couples computing devices 104 with server 118. Network 116 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 118 may include one or more servers or service providers that provide services and/or resources to computing devices 104. Generally, resources provided by server 118 may be licensed, purchased, or may be made freely available, (e.g., without authentication, license, or account-based access). The resources can include any suitable combination of services and content, such as made available over network 116 by one or more providers. Some examples of services include, but are not limited to, an on-line shopping service, a photo editing service, an image database service (e.g., a service providing image pairs from a database), a web development and management service, a collaboration service, a social networking service, a messaging service, an advertisement service, a graphics design service, an image storage service (including storage and access of photos, documents, records, files, and the like), and so forth. Content may include various combinations of assets, including videos, ads, audio, multi-media streams, animations, images, web documents, web pages, applications, device applications, text documents, drawings, presentations, stock photographs, user profiles, user preferences, user data (e.g., images stored in an image gallery), and the like.

Server 118 includes IER collection support system 120 configurable to receive signals from computing devices 104, process the received signals, and send the processed signals to computing devices 104 to support collecting multimodal IERs. Accordingly, IER collection support system 120 of server 118 can include a copy of IER collection system 114, including IER collection application 146 (discussed below in more detail). In one example, computing device 104-1 receives a user selection from user 102 via user interface 106 indicative of a request to provide user input regarding image pair 108, such as a user login to IER collection system 114. Computing device 104-1 may communicate a request to server 118 to participate in multimodal IER collection. IER collection support system 120 can receive the request, and provide a set of image pairs to computing device 104-1. Computing device 104-1 may receive the image pairs, and IER collection system 114 may sequentially expose each image pair from the plurality of image pairs received from IER collection support system 120. For each image pair exposed, IER collection system 114 records a request to skip the image pair, including a reason for skipping the image pair, or for each image pair not skipped, IER collection system 114 records a multimodal IER including a user gesture and a simultaneously-generated voice command that describe an edit of a first image used to generate a second image of the image pair. Data recorded by IER collection system 114, such as audio samples of a voice command, data tuples with coordinates and timestamps describing traces of a user gesture, and transcriptions of voice commands can be packaged by IER collection system 114 and provided to server 118 which stores the packaged data in a database, such as structured database 122 of server 118.

Server 118 also includes training module 124. Training module 124 is representative of functionality configured to train an adaptive model using data stored in structured database 122. Training module 124 can train any suitable adaptive model. In one example, training module 124 trains a neural network using a first image, such as first image 108-1, and packaged data collected by IER collection system 114 indicative of a multimodal IER and stored in structured database 122 as inputs to the neural network, and a second image resulting from edits of the first image, such as second image 108-2, as an output of the neural network. Training module 124 can train an adaptive model with any suitable architecture, such as a neural network, machine learning algorithm, artificial intelligence model, combinations thereof, and the like.

Data used to train an adaptive model by training module 124 can be collected from any suitable number of computing devices. Computing devices 104 are examples of computing devices used to provide data indicative of multimodal IERs that is collected by IER collection system 114, provided to server 118 via network 116, stored in structured database 122, and used to train an adaptive model by training module 124. An adaptive model that has been trained by training module 124 (e.g., a pre-trained neural network) can be communicated from server 118 to computing devices 104 for use in an image editing application of computing devices 104 that recognizes multimodal IERs, such as image editing application 164 (discussed below in more detail).

Computing devices 104 include IER collection system 114 to collect data regarding multimodal IERs. For clarity, computing device 104-1 is illustrated in FIG. 1 as including IER collection system 114, though computing device 104-2 and computing device 104-3 also include copies of IER collection system 114 (not shown), so that users (also not shown) of computing device 104-2 and computing device 104-3 can provide input for collecting multimodal IERs.

IER collection system 114 includes a display 126 for exposing user interfaces including image pairs, such as image pair 108. Display 126 can be any suitable type of display, such as a liquid crystal display, plasma display, head-mounted display, projector and screen, a touchscreen that recognizes user gestures (e.g., touch gestures), and the like. A touchscreen of display 126 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Moreover, display 126 can display any suitable interface, such as user interface 106.

IER collection system 114 also includes processors 128. Processors 128 can include any suitable type and number of processors. Hence, IER collection system 114 may be implemented at least partially by executing instructions stored on storage 130 on processors 128. For instance, processors 128 may execute portions of IER collection application 146, portions of image editing application 164, or portions of both IER collection application 146 and image editing application 164.

Storage 130 can be any suitable type of storage accessible by or contained in IER collection system 114. Storage 130 stores and provides access to and from memory included in storage 130 for any suitable type of data. For instance, storage 130 includes image data 132, including data associated with image pairs, such as image pair 108, including sources of images (e.g., an indicator of a database or image gallery from which an image was obtained, descriptors of capture devices used to capture images, photographer's names who captured images, online stores where images are available, combinations thereof, and the like), metadata of images (e.g., settings of a capture device used to capture an image, such as aperture, shutter speed, focal length, ISO (a measure of light sensitivity of a camera sensor), global positioning system (GPS) coordinates of where an image was captured, a size of an image (e.g., a resolution in number of pixels), a date an image was captured, etc.), a format of an image (e.g., a file format), thumbnail images, a number of an image pair in a set of image pairs, an indicator of edits applied to a first image of an image pair used to generate a second image of the image pair, an indication of whether a particular image pair is a placebo image pair, for which the images of the image pair are not related by editing a first image to generate a second image, combinations thereof, and the like.

Storage 130 also includes voice data 134, including data regarding a voice command of a multimodal IER collected by IER collection system 114, such as an audio file including audio samples of a spoken utterance including a voice command, e.g., voice command 110, timestamps of audio samples generated by IER collection system 114, a language of a voice command, e.g., English, Spanish, or German, a length of a voice command, e.g., a timespan in seconds of a voice command, a sampling rate used to record a voice command, such as 44.1 KHz, a number of bits representing an audio sample, such as one bit (e.g., as used in a pulse-width modulated recording), 16 bits, or 24 bits, a number of times a user attempted to record a voice command, e.g., three indicating three total attempts including two attempts that were discarded, recordings of discarded user attempts to record a voice command, combinations thereof, and the like.

Storage 130 also includes gesture data 136, including data regarding a user gesture of a multimodal IER collected by IER collection system 114, such as a trace of a user gesture, e.g., trace 112, including data tuples including coordinates of samples of a trace, such as Cartesian coordinates, and timestamps used to generate the coordinates, an indication of how a user gesture is performed, such as with a mouse, a stylus, a touch on a touchscreen, a number of touches of a touch, a color of a representation of a user gesture exposed in a user interface, such as a color of trace 112 (e.g., black) selected by a user, data regarding a camera used to detect a user gesture, such as an aperture setting and focal length of a camera of computing device 104-1 used to detect a user gesture, combinations thereof, and the like.

Storage 130 also includes transcript data 138, including data regarding a user transcription of a voice command of a multimodal IER collected by IER collection system 114, such as a user transcription entered by a user responsive to the user playing back a recording of the voice command, a result of processing the user transcription with a natural language processor that identifies parts of speech, intent of the transcription, a number of words in the transcription, a number of proper names in a user transcription, a number of relative terms in a transcription (e.g., a number of occurrences of "this", a number of occurrences of "this" in which an object of the modifier "this" is absent, etc.), and the like, a language of a user transcription, a number of corrections made by a user when entering a user transcription (e.g., backspaces, word changes, and the like), a length of time it took a user to transcribe a voice command and produce a user transcription of the voice command, a text file including a user transcription, combinations thereof, and the like.

Storage 130 also includes instruction data 140, including data regarding instructions exposed in a user interface of IER collection system 114, such as an instructional video describing how a user can review image pairs, skip image pairs, enter multimodal IERs, replay voice commands, change user settings in a user interface, and the like, readme instructions, e.g., text instructions for a user, a list of events that may trigger exposure of an instructional video in a user interface, such as a user selection of a "play video" button, an indication that a user is a novice user, such as an indication that a user has logged into IER collection system to provide data for collecting multimodal IERs for a first time, an indication of a user login, combinations thereof, and the like.

Storage 130 also includes packaged data 142, including data packaged by IER collection system 114, such as data including recordings of voice commands, transcriptions of voice commands, recordings of user gestures, structured data objects including recordings of voice commands, recordings of user gestures and a transcription of a voice command, metadata of packaged data, such as a user identification, an identification of a computing device on which a user was logged in when providing data for collecting multimodal IERs, such as an identification number of computing device 104-1, a length of time a user is logged into IER collection system 114 to enter data for collecting multimodal IERs, a protocol for which data is packaged, such as a protocol using a structured query language (SQL) to query relational databases, combinations thereof, and the like.

Furthermore, IER collection system 114 includes transceiver module 144. Transceiver module 144 is representative of functionality configured to transmit and receive data using any suitable type and number of communication protocols. For instance, data within IER collection system 114 may be transmitted to server 118 with transceiver module 144. Furthermore, data can be received from server 118 with transceiver module 144. Transceiver module 144 can also transmit and receive data between computing devices. In one example, transceiver module 144 includes a low power wireless communication standard (e.g., a Bluetooth® protocol) for communicating data between multiple computing devices included in one of computing devices 104, such as between a first computing device (e.g., a tablet) and a second computing device (e.g., a desktop) operated by a same user, such as user 102.

IER collection system 114 also includes IER collection application 146. IER collection application 146 includes image pair module 148, user interface module 150, recording module 152, playback module 154, transcript module 156, instruction module 158, packaging module 160, and timing module 162. These modules work in conjunction with each other to expose a user interface and collect data of multimodal IERs.

Image pair module 148 is representative of functionality configured to obtain image pairs, such as a pair of images including a first image and a second image. Image pair module 148 can obtain any suitable image pair in any suitable way. In one example, image pair module 148 obtains image pairs from a database of images, such as a database maintained by server 118, e.g., structured database 122. Additionally or alternatively, image pair module 148 obtains image pairs from websites offering image editing services, such as from a website that accepts written IERs and a first image from users, and returns a second image generated by editing the first image according to a written IER.

In one example, image pairs obtained by image pair module 148 include a representation of images included in an image pair, such as a thumbnail image, animation, cartoon, and the like, that can be displayed in a user interface of user interface module 150. Additionally or alternatively, an image pair obtained by image pair module 148 may include metadata, such as a source of an image (e.g., a database name and location where image pair is stored, a photographer's name who captured an image, a computer application used to edit an image, and the like), a date an image was created or captured, a size of an image (number of pixels, file size, etc.), statistics of an image, such as color variance of the content of an image, a description of edits applied to an image, such as edits made to a first image of an image pair used to generate a second image of an image pair, combinations thereof, and the like.

In one example, image pair module 148 obtains an image pair according to a user selection of a representation of an image exposed in a user interface, e.g., a thumbnail image. For instance, a user interface generated by user interface module 150 may include a list of images, such as a drop-down list of user-selectable images or thumbnail representations of images, a toolbar including representations of images, and the like. A user may select a representation of an image in a user interface, and responsive to the selection, image pair module 148 may obtain an image pair corresponding to the selected representation, such as from memory (e.g., local memory of storage 130), a database maintained by a server, such as structured database 122 maintained by server 118, and the like.

In one example, image pair module 148 obtains image pairs according to a selection rule. For instance, image pair module 148 may attempt to obtain image pairs related to an image pair that a user skips in a user interface. When a user skips an image pair in a user interface and indicates that the reason for skipping the image pair is that the two images are too similar, image pair module 148 may obtain an additional image pair that includes images that are similar to one another, images that are dissimilar to one another, images with similar or same subject matter as images of the skipped image pair, and the like.

Additionally or alternatively, when a user selects an option to expose a hint for an image pair, such as when a user selects a "hint" button in a user interface to indicate in an image a location of a first edit, image pair module 148 may obtain an additional image pair that includes images that are related by a similar type of edit as the first edit. For instance, if a user prompts a hint for a pair of images created by applying a type of filter, e.g., a sepia filter, image pair module 148 may obtain an additional image pair that includes an image that has been edited with the type of filter e.g., the sepia filter.

In one example, at least one image pair of a plurality of image pairs obtained by image pair module 148 is a placebo image pair. A placebo image pair includes a first image and a second image that are not related by editing the first image to create the second image. For instance, a first image may include a farmyard scene, and a second image may include a street scene that is not generated from the farmyard scene. A placebo image pair can be used to remove bias introduced by human nature in data of multimodal IERs collected by IER collection system 114.

An image pair obtained by image pair module 148, along with any suitable information, such as representations of images in an image pair (e.g., thumbnail images), a source of an image (e.g., a database name and location where an image pair was obtained), an indication of whether an image pair was obtained responsive to a user selection (e.g., a user selection of a thumbnail image exposed in a user interface), metadata of an image pair, a size of an image (number of pixels, file size, etc.), and the like used by or calculated by image pair module 148 are stored in image data 132 of storage 130 and made available to modules of IER collection application 146. In one example, a plurality of image pairs obtained by image pair module 148 are sequentially exposed (e.g., one image pair at a time) in a user interface generated by user interface module 150.

User interface module 150 is representative of functionality configured to generate, manage, and expose on any suitable display a user interface for collecting multimodal IERs. User interface module 150 generates a user interface that can expose any suitable image, such as simultaneously expose a first image and a second image of an image pair. In one example, a user interface of user interface module 150 exposes a plurality of image pairs obtained by image pair module by sequentially exposing each image pair (e.g., exposing one image pair after another image pair). A user interface of user interface module 150 exposes an image pair by simultaneously displaying a respective first image and a respective second image of the image pair, such as by displaying two images proximate to each other.

A user interface of user interface module 150 can expose any suitable data, such as options for selecting image pairs, including lists, toolbars, menus, and the like that include representations of images or image pairs (e.g., thumbnail images). In one example, a user interface of user interface module 150 exposes thumbnail representations of images included in image pairs. A user can select a thumbnail representation and cause an image pair corresponding to the selected thumbnail representation to be exposed in a user interface of user interface module 150.

In one example, a user interface of user interface module 150 exposes an indicator of an image pair that is displayed in the user interface, such as a name of an image pair, a number of an image pair, a number of an image pair in a sequence or group of image pairs (e.g., "1/20"), a designator that an image pair currently exposed was previously skipped by a user, a category for which an image pair belongs (e.g., "automobiles" for images of cars, trucks, etc., "animals" for images of dogs, cats, cows, etc.), combinations thereof, and the like.

A user interface of user interface module 150 can expose any user-selectable options, such as controls, buttons, tables, sliders, menus, drop-down lists, text boxes, filmstrip, toolbar, and the like. In one example, a user interface of user interface module 150 exposes a user-selectable option to enter a multimodal IER regarding an image pair exposed in the user interface. For instance, a user interface may include a "Start Recording" selection that when enabled by a user causes a microphone or array of microphones to be configured to receive a voice command (e.g., a spoken utterance). A user interface may include a "Stop Recording" selection that when enabled by a user causes a microphone or array of microphones to be configured to stop receiving a voice command and cease recording of the voice command, user gesture, or both.

Additionally or alternatively, a user interface may be configured to display a trace corresponding to a user gesture performed simultaneously with a voice command, the user gesture and the voice command describing an edit of a first image of the image pair included in a second image of the image pair. For instance, a user may simultaneously speak "Turn this into a giraffe" while circling a dog in a first image that has been replaced in a second image with a giraffe, and a user interface of user interface module 150 may expose a trace of the circling on the first image. Accordingly, a user interface may include a user-selectable option to set a color of a marker that is used to trace a user gesture, so that a marker color may be set so that a trace may be distinguished from content of an image. For instance, if an object of an image being indicated by a user gesture is black, a marker color may be set to white so that a trace of the user gesture is visible against the black object.

In one example, a user interface of user interface module 150 exposes an option to enter multiple multimodal IERs for a pair of images. For instance, a user interface may expose a prompt "Would you like to record another image editing request?" for an image pair. Another image pair may be exposed in the user interface responsive to a user entering an indication that no more multimodal IERs are to be entered for a currently-exposed image pair.

Additionally or alternatively, a user interface of user interface module 150 may expose a user-selectable option to skip an image pair. To skip an image pair, a user may need to provide a reason for skipping the image pair, such as by selecting one of a plurality of reasons exposed in a user interface (e.g., reasons exposed in a drop-down menu), entering their own reason (e.g., entering text describing a reason for skipping an image pair), combinations thereof, and the like.

In one example, a user interface of user interface module 150 exposes a user-selectable option to display a hint regarding an edit of an image in an image pair. For instance, a user interface may expose a hint button that when selected, causes display in the user interface of a representation of a hint. A representation of a hint can be any suitable representation, such as a text box including text describing a hint of an edit (e.g., "Look at the person's eye" for an image pair where a person's eye has been edited), shading an area where an edit has been applied, highlighting an area where an edit has been applied, flashing between colors (e.g., blinking) in an area where an edit has been applied, marking an area where an edit has been applied, such as by circling it or filling it, combinations thereof, and the like.

In one example, a representation of a hint exposed in a user interface includes a number of edits applied to an image in an image pair. For instance, for a second image that has been created by editing a first image according to changing a color of a background and cropping the first image, a representation of a hint may indicate two edits for the image pair. Additionally or alternatively, the representation of the hint may indicate a type of each edit, such as "one color adjustment, one crop adjustment".

A user interface of user interface module 150 may also expose a user-selectable option for user instructions on how to enter data for collecting multimodal IERs. In one example, a user interface includes a "Play Video" button that when executed by a user, causes a video providing user instruction for operating a multimodal IER collection system (e.g., IER collection system 114) to be exposed in the user interface. For instance, instruction module 158 (discussed below in more detail) may obtain any suitable instructional video to teach a user how to simultaneously enter multimodal IERs, such as a video including an example image pair, example IERs, instructions for skipping the example image pair, and instructions for accessing a hint describing the example IERs.

Once a user has entered a multimodal IER (e.g., voice command and user gesture) via a user interface of user interface module 150, a user may play back a recording of the multimodal IER. For instance, a user may select an indicator of a recorded voice command, such as a number, name, timestamp, and the like, and select a "Play" button to play back the recording of the voice command In one example, a trace of the user gesture that was simultaneously performed by the user with the voice command is also played back in the user interface simultaneously with the recording of the voice command. For instance, when a user selects to play back a voice command, while the voice command is played back through a speaker, a trace of the user gesture is exposed synchronously, based on timestamps in the recordings, with the voice command Hence, a user may see a representation of their user gesture together with hearing their voice command.

Based on playing back a voice command, a user may enter a transcription of the voice command in a user interface of user interface module 150. In one example, a user interface exposes a text box in which a user may enter text to transcribe a voice command, such as by typing a transcription of the voice command in the text box. Additionally or alternatively, a user interface may expose a text box for transcribing a voice command responsive to a user selection to play back a voice command. So that a user may exactly enter text corresponding to the spoken utterance of a voice command, a user interface of user interface module 150 may expose a user-selectable option to replay a recording of a voice command, such as a "Replay" button. By replaying a voice command, a user can reduce errors in a transcription of their voice command.

A user interface generated by user interface module 150, along with any suitable information, such as configurations settings of the user interface, user selections (e.g., indications of skipped image pairs, reasons for skipping image pairs, hints accessed by users, instructions accessed by users, marker colors selected by users, discarded recording attempts of users, etc.), user preferences (e.g., font size, font type, layout, such as whether a user prefers to display images horizontally next one another or vertically on top of one another, etc.), user histories (e.g., a history of user selections and choices from pervious times a user has logged on to IER collection system 114 and provided data to collect multimodal IERs), and the like, used by or calculated by user interface module 150 are stored in storage 130 and made available to modules of IER collection application 146. In one example, a user interface generated by user interface module 150 exposes image pairs obtained by image pair module 148 and receives a user gesture and voice command of a multimodal IER recorded by recording module 152. Additionally or alternatively, a user interface generated by user interface module 150 can be exposed on display 126.

Recording module 152 is representative of functionality configured to record data of multimodal IERs. Recording module 152 can record any suitable data of a multimodal IER in any suitable way. In one example, recording module 152 simultaneously records a user gesture and a voice command that describe an edit of a first image used to generate a second image in an image pair exposed in a user interface of user interface module 150. For instance, recording module 152 can record coordinates of a user gesture and audio samples of a voice command.

Recording module 152 can record a user gesture in any suitable way. In one example, recording module 152 records a user gesture by recording coordinates of a user gesture and a timestamp corresponding to the coordinates. Coordinates can include any suitable reference designator to locate a user gesture relative to an image, such as Cartesian coordinates of a mouse cursor exposed on an image (e.g., coordinates identifying the cursor on a display screen on which the image is located).

Timing module 162 may generate sampling instances (e.g., timing epochs of when to generate a sample, such as coordinate of a user gesture) and timestamps corresponding to the sampling instances, such as from a master clock, and provide the timestamps to recording module 152. Recording module 152 may represents samples of a user gesture as data tuples including coordinates of the user gesture and a respective timestamp, such as by {x, y, t} where x denotes a coordinate of a user gesture in a first dimension (e.g., horizontal), y denotes a coordinate of a user gesture in an orthogonal dimension (e.g., vertical), and t denotes a timestamp of the coordinates.

Recording module 152 may generate samples of a user gesture at any suitable rate. In one example, recording module 152 records samples of a user gesture at a sample rate determined from a display refresh rate, such as a display refresh rate of display 126. For instance, for 60 Hz refresh rates, such as is common in many countries, 60 samples of a user gesture (e.g., 60 data tuples as described above) may be generated by recording module 152. Additionally or alternatively recording module 152 may generate samples of a user gesture at a sample rate less than a display refresh rate, such as by downsampling the display refresh rate and generating samples for every $N^{th}$ cycle of a clock determining the refresh rate, for some integer N. Accordingly, timing module 162 may generate timestamps based on a display refresh rate at any suitable rate and provide the timestamps to recording module 152.

Recording module 152 can record a voice command in any suitable way. In one example, recording module 152 records a voice command by recording audio samples of a voice command and a timestamp corresponding to the audio samples, such as an audio file where each sample of the audio file includes a respective timestamp. Timing module 162 may generate audio sampling instances (e.g., timing epochs of when to generate an audio sample) and timestamps for the audio samples, and provide the timestamps to recording module 152. Recording module 152 may represent audio samples of a voice command in any suitable way, such as by a modulation index of a one-bit pulse width modulator in a delta-sigma modulator, a number of bits (e.g., 16 bits), combinations thereof, and the like.

Recording module 152 can generate audio samples of a voice command at any suitable rate. In one example, recording module 152 generates audio samples at 44.1 KHz. Recording module 152 may generate audio samples of a voice command at a rate that is not synchronized with a display refresh rate at which recording module 152 generates coordinate data of a user gesture. Accordingly, recording module 152 may generate audio samples of a voice command asynchronously from coordinate data of a user gesture. However, by recording timestamps for the audio samples and timestamps for the coordinate data, playing back of the user gesture can be synchronized with playing back of the voice command, despite that the audio samples and the coordinate data may be sampled asynchronously.

Recording module 152 can record any suitable data regarding a multimodal IER, such as a user selection to skip an image pair, reasons for skipping an image pair, a transcription of a voice command entered by a user (e.g., a user transcription), combinations thereof, and the like. In one example, a user interface sequentially exposes a plurality of image pairs, and for each image pair, recording module 152 records a user selection to skip the image pair, or simultaneously records, for each image pair that is not skipped, a user gesture and a voice command that describe an edit of a first image used to generate a second image of the image pair.

Recordings generated by recording module 152, along with any suitable information, such as coordinates of user gestures, audio samples, audio files, timestamps, data tuples, formats of samples generated by recording module 152, such as designators of bit widths, indicators of sample rates, and the like, used by or calculated by recording module 152 are stored in storage 130 and made available to modules of IER collection application 146. For instance, data and recordings regarding voice commands are stored in voice data 134, and data and recordings regarding user gestures are stored in gesture data 136. In one example, voice data 134 and gesture data 136 are merged into a single data storage location so that voice data and gesture data corresponding to a same multimodal IER can be collocated when stored, such as in common directory of portion of a memory map. Records of data for multimodal IERs generated by recording module 152 can be provided to playback module 154 and packaging module 160.

Playback module 154 is representative of functionality configured to play back a recording of a voice command, a recording of a user gesture, or combinations thereof. In one example, playback module 154 plays back a voice command on a speaker while simultaneously causing a representation of a user gesture, such as a trace caused by a mouse movement, to be exposed on a user interface of user interface module 150. Additionally or alternatively, a user interface of user interface module 150 may include a user-selectable option to toggle between enabling and disabling a representation of a user gesture to be exposed in a user interface while a voice command is played back by playback module 154.

Playback module 154 can play back a voice command, a user gesture, or both a voice command or use gesture based on recordings from recording module 152 for any suitable reason. In one example, playback module 154 causes a recording of an audio file of a voice command to be played back on a speaker responsive to a user selection in a user interface, such as a "Play" button. Additionally or alternatively, playback module 154 causes a recording of an audio file of a voice command to be played back on a speaker after a prescribed amount of time after the recording of the voice command is completed. For instance, a user may record a voice command and complete the recording by entering a "Stop Recording" button. Once the recording is completed, playback module 154 may initiate a timer that, once expired, causes the recording to be played back via a speaker, such as two seconds after the recording is complete. Hence, once a user finishes recording a voice command and has not deleted the recording (e.g., to start a new recording), playback module 154 may cause the recording to be played back automatically and without additional user input, making it efficient for the user to confirm their voice command is acceptable to them.

Data generated and processed by playback module 154, along with any suitable information, such as user selections to play back a voice command separate or together with a corresponding trace of a user gesture, a number of times a user plays back a particular audio file of a voice command, a number of times a user pauses an audio file while it is being played, and the like, used by or calculated by playback module 154 are stored in storage 130 and made available to modules of IER collection application 146.

Transcript module 156 is representative of functionality configured to receive user transcriptions of voice commands (e.g., typed input) and generate transcriptions (e.g., a text file). Transcript module 156 can receive a user transcription of a voice command in any suitable way. In one example, a user enters a multimodal IER including a voice command and user gesture via a user interface of user interface module 150, such as by selecting a "Record Now" button and simultaneously speaking the voice command while motioning a user gesture (e.g., with a mouse or touch on a touchscreen). The user may enable playback of a recorded voice command via the user interface, such as with a "Play" button. Responsive to enabling playback of a voice command, the user interface may expose a text box in which a user types a transcription of their voice command Transcript module 156 obtains a user transcription of the voice command via the user interface, and represents the user transcription in any suitable way, such as by generating a transcription in a text file (e.g., with American standard code for information interchange (ASCII) characters).

The user interface may provide an option to replay the voice command so that the user can exactly transcribe the voice command, word for word, minimizing chances of an error in the transcription relative to the spoken voice command In one example, a user is required to enter a user transcription of a voice command for a pair of images exposed in a user interface before another pair of images is exposed in the user interface. For instance, transcript module 156 may require that a user transcription is received before communicating to a user interface to expose another pair of images. Hence, the transcription and the voice command are user generated while a pair of images are exposed in the user interface, rather than generating a transcription of the voice command at a later date and by a different user than the user who spoke the voice command.

Additionally or alternatively, transcript module 156 can receive a user transcription of a voice command from a same user who spoke the voice command at a later date than the spoken utterance of a voice command. For instance, a user may log onto IER collection system 114 and enter multimodal IERs for a plurality of image pairs. At a later date, such as the next day, the same user may again log onto IER collection system 114 and enter transcriptions of the voice commands previously entered, by playing back recordings of the voice commands.

In one example, transcript module 156 identifies errors in a user transcription and causes a user interface of user interface module 150 to indicate the errors and prompt for a user correction. For instance, transcript module 156 may identify typos, misspellings, punctuation errors, and the like, and cause a dialog box to be exposed in a user interface that queries a user for correction, such as "The word 'fyretrick' appears to be misspelled. Do you mean 'firetruck'?" when a user types "Change this to a fyretrick".

A user transcription received by transcript module 156, along with any suitable information, such as a number of times a recording of a voice command was played back while a user typed a transcription, metadata of text of a transcription, such as font type, font size, language, etc., a number of corrections a user made while typing a transcription, such as number of backspaces, misspellings, etc., whether a user was prompted to correct an error in a user transcription, and the like, used by or calculated by transcript module 156 are stored in transcript data 138 of storage 130 and made available to modules of IER collection application 146. In one example, a transcription generated by transcript module 156 is provided to packaging module 160.

Instruction module 158 is representative of functionality configured to provide instructional information to a user interface of user interface module 150 for exposure to a user to teach the user how to use IER collection system 114, such as how to enter data for collecting multimodal IERs. Instruction module 158 can provide any suitable instructional information, such as a video, documentation, slide presentation, animation, image, combinations thereof, and the like. In one example, instruction module 158 plays a video via a user interface providing user instruction for operating IER collection system 114. The video includes an example image pair, example image editing requests, instructions for skipping the example image pair, and instructions for accessing a hint describing the example image editing requests.

A user interface may expose user-selectable controls to cause instruction module 158 to retrieve and provide an appropriate piece of instructional information. In one example, a user interface may expose a "Play Video" that when selected by a user causes instruction module 158 to retrieve and provide an instructional video, as described above. Additionally or alternatively, a user interface may expose a menu of options for different types of instructional information that instruction module 158 can provide, such as a drop-down menu including a plurality of tabs (e.g., a tab for an instructional video, a tab for text documentation, and a tab for a slideshow). Based on a tab that a user selects, instruction module 158 retrieves suitable instructional information from instruction data 140 (e.g., a set of slides when a user selects a slideshow tab), and provides the instructional information to a user interface of user interface module 150 for exposure to a user.

In one example, instruction module 158 plays an instructional video on how to use IER collection system 114 responsive to a user's first login to IER collection system 114 (e.g., the user is a new user to IER collection system 114). For instance, when a user logs on to IER collection system 114 to enter data for collecting multimodal IERs for a first time, instruction module 158 may play an instructional video automatically and without explicit user selection to play the instructional video.

Instructional information of instruction module 158, along with any suitable information, such as user selections of instructional information (e.g., whether a user selected to play an instructional video or display an instructional slideshow), a number of times instructional information is exposed to each user, a number of times a user pauses an instructional video, timestamps of an instructional video where a user pauses the instructional video, and the like, used by or calculated by instruction module 158 are stored in instruction data 140 of storage 130 and made available to modules of IER collection application 146. In one example, instruction module 158 obtains an instructional video and plays the instructional video on a user interface of user interface module 150.

Packaging module 160 is representative of functionality configured to package data of a multimodal IER into a data object, such as a structured data object useable in a relational database (e.g., structured database 122). Packaging module 160 can package data of a multimodal IER into a data object in any suitable way. In one example, packaging module 160 packages a recording of a user gesture generated by recording module 152, a recording of a voice command generated by recording module 152, and a transcription generated by transcript module 156 from a user transcription received via a user interface of user interface module 150 as a structured data object.

In one example, a structured data object generated by packaging module 160 includes metadata including a user identification (e.g., an identification of user 102, such as an account number), an identification of a computing device (e.g., one of computing devices 104), and a length of time IER collection system 114 is in use to collect multimodal IERs (e.g., a length of time a user is logged in to IER collection system 114 to enter data for collecting multimodal IERs).

Structured data objects generated by packaging module 160 can include voice commands, user gestures, and user transcriptions of the voice commands representing multimodal IERs, and together with image pairs are suitable as training data to train an adaptive model to recognize multimodal IERs. Accordingly, an adaptive model, such as a neural network, machine learning algorithm, artificial intelligence model, and the like, trained with packaged data (e.g., structured data objects) generated by packaging module 160 is suitable for use in an image editing application to recognize multimodal IERs including simultaneous voice commands and user gestures. An image editing application so equipped significantly reduces the user effort needed to accomplish image editing tasks compared to image editing applications that not include an adaptive model trained with packaged data like the packaged data generated by packaging module 160.

Packaged data packaged by packaging module 160, along with any suitable information, such as structured data objects including a recording of a user gesture (e.g., data tuples including coordinates and timestamps), a recording of a voice command (e.g., an audio file with timestamps of audio samples), and a user transcription of the voice command, metadata, and the like, used by or calculated by packaging module 160 are stored in packaged data 142 of storage 130 and made available to modules of IER collection application 146. In one example, packaging module 160 packages data of a user gesture, a voice command, and a user transcription of the voice command for a multimodal IER into a structured data object, and provides the structured data object to training module 124 to train an adaptive model (e.g., a neural network) of training module 124. Once trained, training module 124 may provide a trained neural network to an image editing application of a computing device (e.g., image editing application 164 of one of computing devices 104) to recognize multimodal IERs.

Timing module 162 is representative of functionality configured to generate, manage, and distribute control signals of IER collection system 114. Timing module 162 can generate, manage, and distribute any suitable type of control signal to operate IER collection system 114. In one example, timing module 162 performs user verification and authentication functions. Accordingly, timing module 162 may verify a user authentication, such as by matching a user identification, computer identification, password, combinations thereof, and the like, against data stored in a verification database (e.g., part of storage 130). Timing module 162 may therefore detect when a user logs into IER collection system 114 for a first time (e.g., timing module 162 may be able to determine if a user is a new user to IER collection system 114). For new users detected by timing module 162, timing module 162 may provide a control signal to instruction module 158 to automatically play an instructional video on a user interface of user interface module 150.

Additionally or alternatively, timing module 162 generates timestamps for recordings generated by recording module 152. For instance, timing module 162 generates timestamps for audio samples of voice commands and timestamps for coordinates of traces of a user gesture (e.g., timestamps included in data tuples with coordinates and timestamps, as described above). Accordingly, timing module 162 includes, or has access to, a clock, such as a master clock, phase locked loop, frequency synthesizer, oscillator, and the like from which timing module 162 generates timestamps.

In one example, timing module 162 records data regarding a user while a user is logged on to IER collection system 114 to provide data for collecting multimodal IERs. For instance, timing module 162 may keep track of a number of skipped images, the time a user spends on IER collection system 114, user selections (e.g., reasons a user skips an image pair), combinations thereof, and the like. Hence, timing module 162 may enforce rules regarding the operation of IER collection system 114, such as a minimum number of image pairs for which a user must enter at least one multimodal IER to complete a session and get paid, a minimum number of image pairs a user must view to complete a session and get paid, a minimum or maximum time a user can remain logged in to IER collection system 114, a maximum number of image pairs a user may skip, combinations thereof, and the like.

Additionally or alternatively, rules enforced by timing module 162 may include restricting input from certain users. For instance, timing module 162 may monitor a number of multimodal IERs provided by a user, a number of image pairs exposed to a user, a length of time a user is logged on to IER collection system 114, and the like, and prohibit a user from logging on to IER collection system 114 or providing further input for multimodal IER based on a certain user abusing IER collection system 114, such as by spending too much time on IER collection system 114, providing too much input, or viewing too many image pairs.

Timing module 162 may also manage the sequencing of image pairs that are exposed in a user interface. For instance, timing module 162 may determine a next image pair to expose in a user interface based on user selections, such as image pairs a user has skipped, reasons a user skipped an image pair, a user transcription, a multimodal IER received from a user, combinations thereof, and the like. Accordingly, timing module 162 may instruct image pair module 148 to obtain an image pair based on a user selection, an image pair skipped by a user, and the like.

In one example, timing module 162 distributes control signals to modules of IER collection system 114. For instance, timing module 162 may provide an enable signal to instruction module 158 so that instruction module 158 initiates play of an instructional video. The enable signal may be generated based in timing module 162 determining that a user is a new user. Timing module 162 may provide configuration settings to user interface module 150, such as configuration settings instructing user interface module 150 to expose a text box so a user may enter a transcription of a voice command.

Signals generated by timing module 162, along with any suitable information, such as timestamps, records of user selections, time durations, timestamps, configuration settings, enable and disable signals, and the like, used by or calculated by timing module 162 are stored in storage 130 and made available to modules of IER collection application 146. In one example, timing module 162 provides timestamps to recording module 152.

IER collection system 114 also includes image editing application 164. Image editing application 164 can include any suitable application for editing images, such as an image editing application configured to accept multimodal IERs. In one example, image editing application 164 includes a pre-trained adaptive model, such as a neural network that has been trained by training module 124 of server 118 to recognize multimodal IERs. Hence, image editing application 164 can receive simultaneous voice commands and user gestures to edit images.

By including image editing application 164, IER collection system 114 enables users to edit images with an adaptive model that is pre-trained with data collected by IER collection system 114. Hence, a user may experience the results of providing data to IER collection system 114 for collecting multimodal IERs by editing images with multimodal IERs, and improve the quality of their input for future sessions of collecting multimodal IERs.

Having considered an example digital medium environment, consider now a discussion of an example system in accordance with one or more aspects of the disclosure.

Example Multimodal IER Collection System

Figure 2:
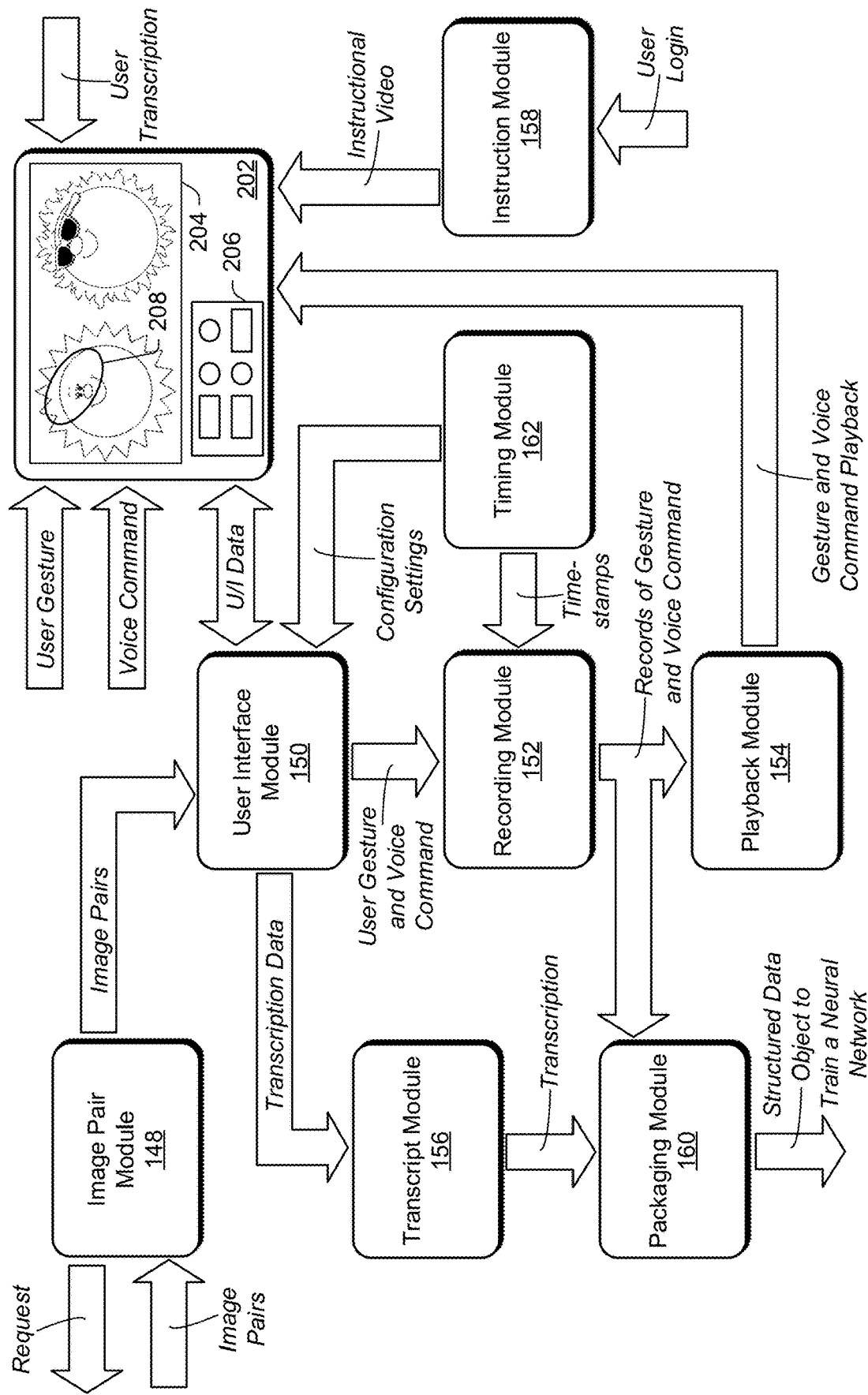
FIG. 2 illustrates an example system in accordance with one or more aspects of the disclosure.

FIG. 2 illustrates an example system 200 in accordance with one or more aspects of the disclosure. In this implementation, system 200 includes the modules of IER collection application 146 as described in FIG. 1, e.g., image pair module 148, user interface module 150, recording module 152, playback module 154, transcript module 156, instruction module 158, packaging module 160, and timing module 162. System 200 is one example of IER collection system 114 that can be constructed using the modules of IER collection application 146. For instance, signals can be redefined, and modules can be modified, combined, divided, added, or removed to form a modified system, without altering the functionality of system 200. Accordingly, such modified systems are considered to be within the scope of the disclosure.

Furthermore, for simplicity system 200 is limited to the modules of IER collection application 146 and a description of some of their interconnects. System 200 can, however, include any suitable signals and communications between modules omitted for simplicity. Such signals may include system clocks, counters, image pair indicators, enable and disable signals, control signals, reset signals, and the like. In one example, system 200 can operate in real time (e.g., with no perceptible delay to a user) to collect multimodal IERs. Accordingly, signals can be calculated by the modules of system 200 and communicated between the modules of system 200 without significant delay. Furthermore, a user can use system 200 with multiple image pairs, and repeatedly load image pairs into system 200 and enter one or more multimodal IERs for each image pair exposed by system 200.

Moreover, system 200 can be implemented on any suitable device or devices. In one example, system 200 is implemented on one computing device (e.g., one of computing devices 104 in FIG. 1). In another example, system 200 is implemented on more than one computing device. For instance, parts of system 200 can be implemented by a first computing device, such as computing device 104-1 in FIG. 1, and other parts of system 200 can be implemented by an additional computing device or devices, such as an another computing device of user 102 (not shown in FIG. 1), or a computing device of another user than user 102, such as computing device 104-2. In one example, a server implements parts of system 200, such as server 118 in FIG. 1. A server can be remote, e.g., because it is not collocated with the first computing device. A server may be configured to receive signals of system 200 from a computing device (e.g., one or more of computing devices 104), process the received signals, such as with IER collection support system 120, and transmit results of the processing back to the computing device. Hence, IER collection support system 120 of server 118 in FIG. 1 may include system 200.

Image pair module 148 obtains a plurality of image pairs, each image pair including a respective first image and a respective second image. In one example, image pair module 148 obtains image pairs responsive to a request to obtain image pairs. For instance, image pair module 148 may communicate a request for image pairs to IER collection support system 120 of server 118 in FIG. 1. In response to receiving the request from image pair module 148, IER collection support system 120 may obtain a plurality of image pairs from structured database 122 and provide them to image pair module 148. Image pair module 148 provides image pairs to user interface module 150.

User interface module 150 receives image pairs from image pair module 148 and exposes the image pairs in user interface 202, such as by sequentially exposing the image pairs (one after another) in an order determined by timing module 162. Exposing each image pair includes simultaneously displaying a respective first image and a respective second image of each image pair.

User interface 202 is an example of user interface 106 in FIG. 1, and in the example in FIG. 2 exposes image pair 204. User interface 202 also exposes controls 206, which include any suitable options, such as user-selectable options to skip an image, record, play, replay, erase, cancel, display a text box to transcribe a voice command, adjust volume during playback, set a color of a representation of a user gesture, enter an additional multimodal IER, select an image pair, and the like.

User interface module 150 communicates with user interface 202 by sending and receiving user interface data. User interface data sent to user interface 202 from user interface module 150 may include any suitable data, such as configuration settings, user preferences, and the like. User interface data sent to user interface module 150 from user interface 202 may include any suitable data, such as data of a user gesture received via user interface 202 (e.g., touch locations, pressures, areas, etc.), voice command data (e.g., signals output from a microphone), user transcription data (e.g., text typed by a user), and the like.

In the example in FIG. 2, user interface module 150 receives user interface data including data for a simultaneous user gesture and voice command, such as a voice command describing image pair 204 (e.g., "Put sunglasses here") while a user identifies eyes of the sun with a user gesture indicated by ellipse 208 (e.g., ellipse 208 indicates a trace of the user gesture). User interface module 150 provides data for the user gesture and data for voice command received via user interface 202 to recording module 152.

Recording module 152 receives data for a user gesture and data for a voice command from user interface module 150 and simultaneously records the user gesture and the voice command. The user gesture and voice command describe an edit of a first image of image pair 204 used to generate a second image of image pair 204. Recording module 152 also receives timestamps from timing module 162 so that recording module 152 simultaneously records the user gesture and the voice command by recording a respective timestamp for each sample of the user gesture generated in the recording and each sample of the voice command generated in the recording. A sample of a user gesture may be represented as a data tuple including coordinates and a timestamp. In one example, recording module 152 generates data tuples at a sample rate that is synchronous with a refresh rate of a display screen on which user interface 202 is exposed. A sample of a voice command may be any suitable audio sample, such as a 16-bit word representing an audio level appended with a timestamp received by timing module 162.

Recording module 152 provides a record of a user gesture (e.g., a file containing a plurality of data tuples denoting a trace of the user gesture) and a record of a voice command (e.g., an audio file including audio samples with timestamps) to playback module 154 and packaging module 160.

Playback module 154 plays back a voice command, such as by playing back audio samples in an audio file through a speaker system. In one example, playback module 154 simultaneously draws a trace of a user gesture on user interface 202 while playing back a voice command on a speaker, so a user may see a representation of their user gesture while listening to a recording of their voice command.

In one example, based on a user selecting to play back a voice command via playback module 154, timing module 162 provides configuration settings to user interface module 150 to configure user interface 202 to expose a text box where a user may transcribe their voice command while listening through a speaker system of a play back of their voice command.

A user enters a transcription of a voice command of a multimodal IER into user interface 202, and data of the transcription is provided via user interface data to user interface module 150. For instance, a user may play back a recording of a voice command any suitable number of times to enter a transcription of the voice command by typing with a keyboard or keypad into a text box. As an example, a voice command may include the spoken utterance "Put sunglasses here" for image pair 204, and a user may type into a text box (not shown) of user interface 202 the text PUT SUNGLASSES HERE. User interface module 150 provides transcription data corresponding to a user transcription entered into user interface 202 to transcript module 156.

Transcript module 156 receives transcription data corresponding to a user transcription entered into user interface 202 from user interface module 150 and generates a transcription. Transcript module 156 can generate any suitable transcription of a voice command, such as a text file in ASCII format.

In one example, transcript module 156 includes a natural language processor that processes a transcription to identify parts of speech, intent of the transcription, a number of words in the transcription, a number of proper names in a user transcription, a number of relative terms in a transcription (e.g., a number of occurrences of "this", a number of occurrences of "this" in which an object of the modifier "this" is absent in the transcription), and the like. Hence, a transcription generated by transcript module 156 may include results of a natural language processor. By including results of a natural language processor with a transcription of a voice command of a multimodal IER, a training set can be targeted to specific multimodal IERs (e.g., crop IERs), specific content of an image pair, and the like. Hence, a targeted training set can be created and used to train an adaptive model (e.g., a neural network) by training module 124 in FIG. 1 based on metadata of a transcription that includes results of a natural language processor.

Transcript module 156 provides a transcription of a voice command to packaging module 160. Packaging module 160 receives a transcription of a voice command from transcript module 156 and records of a user gesture and a voice command from recording module 152, and generates packaged data from the transcription, user gesture, and voice command data. Packaging module 160 can package data in any suitable way. In the example in FIG. 2, packaging module 160 packages a transcription of a voice command from transcript module 156, and records of a user gesture and a voice command from recording module 152 into a structured data object, such as a data object suitable for storage in a relational database (e.g., a SQL) database. In one example, packaging module 160 provides a structured data object to training module 124 to be used as training data to train a neural network.

In the example in FIG. 2, system 200 includes instruction module 158 that provides an instructional video describing how to operate system 200. For instance, timing module 162 may detect any suitable event to trigger playing of an instructional video, such as a user login (e.g., a user may be a new user as determined from a first login by the user, an amount of time since a user's last login is greater than a threshold amount of time, such as 45 days, and the like). Timing module 162 may enable instruction module 158 to expose an instructional video on user interface 20 by providing a control signal to instruction module 158 (e.g., indicating a user login), and providing configuration settings to user interface module 150 to configure user interface 202 to play the instructional video of instruction module 158.

The systems described herein constitute an improvement over systems that do not collect data for multimodal IERs. Rather than relying on voice commands alone, or written IERs gleaned from websites offering image editing services, the systems described herein collect multimodal IERs, including voice commands and user gestures performed simultaneously that describe an edit to an image. Furthermore, a same user who spoke a voice command can enter a transcription of the voice command, immediately after speaking the voice command by playing back a recording of the voice command a desired amount of times. Hence, the systems described herein reduce a number of errors in transcriptions of voice commands compared to systems where a different user than the user who spoke a voice command may transcribe a recording of a voice command. Accordingly, the systems described herein collect multimodal IERs suitable to train an adaptive model, such as a neural network, machine learning algorithm, artificial intelligence model, and the like for use in recognizing multimodal IERs. Hence, an adaptive model trained with data collected by the systems described herein can be implemented in an image editing application configured to accept multimodal IERs, significantly reducing the amount of user effort needed to edit images compared to image editing applications that do not accept multimodal IERs.

Having considered an example system 200, consider now a discussion of example user interfaces in accordance with one or more aspects of the disclosure.

Example User Interfaces

Figure 3:
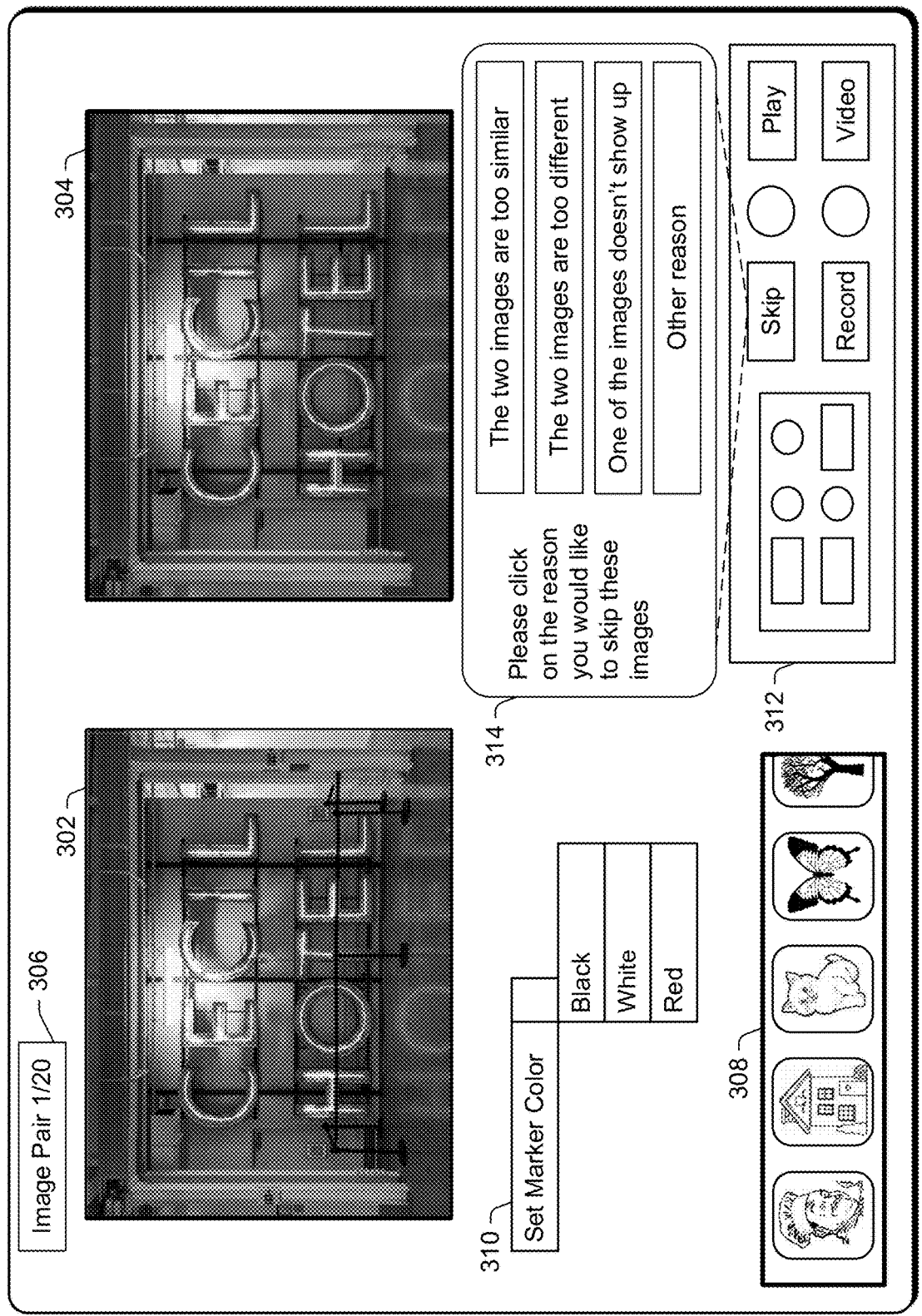
FIG. 3 illustrates an example user interface in accordance with one or more aspects of the disclosure.

FIG. 3 illustrates an example user interface 300 in accordance with one or more aspects of the disclosure. User interface 300 is an example of a user interface generated by user interface module 150 in FIG. 1 and FIG. 2. User interface 300 exposes an image pair including first image 302 and second image 304. User interface 300 includes an indicator 306 of the image pair that includes first image 302 and second image 304. Indicator 306 can be any suitable image of an image pair, such as a title, category, number, name, location (e.g., path or database location), and the like. In the example in FIG. 2, indicator 306 denotes a number of the image pair that includes first image 302 and second image 304 in a group of image pairs, and indicates that the image pair is a first pair of twenty image pairs, or "Image Pair 1/20".

User interface 300 also includes toolbar 308, marker selection 310, controls 312, and menu 314. Toolbar 308 exposes representations of image pairs, such as thumbnail images, text descriptions of images, drawings, etc. In the example in FIG. 3, toolbar 308 exposes thumbnail representations of images in image pairs. For instance, each thumbnail image exposed by toolbar 308 corresponds to an image of an image pair that can be exposed in user interface 300. A user may select one of the thumbnail images in toolbar 308 (e.g., with a mouse click or touch of a thumbnail image) to skip first image 302 and second image 304 and cause another image pair to be exposed. In one example, a user skips the image pair including first image 302 and second image 304 by selecting one of the thumbnail images of toolbar 308.

Additionally or alternatively, a user may skip the image pair including first image 302 and second image 304 by selecting a "Skip" button of controls 312. Responsive to a user selecting to skip the image pair including first image 302 and second image 304, menu 314 may be exposed. Menu 314 includes a prompt to "Please click on the reason you would like to skip these images". Menu 314 also includes four selectable options: (i) "The two images are too similar", (ii) "The two images are too different", (iii) "One of the images doesn't show up", and (iv) "Other reason". A user may click on one of the selectable options to enter a reason why an image is skipped. In one example, once a user selects the "Other reason" option, a text box is exposed in user interface 300 (not shown) where the user may enter a reason, such as by typing with a keyboard. Hence, before another image pair is exposed, a user may be required to enter a reason why the image pair is being skipped. In the example in FIG. 3, second image 304 has been created by editing first image 302 to remove a railing in front of the sign that says "Cecil Hotel", making first image 302 similar to second image 304. For instance, some users may not see that the railing is removed and select the first option of menu 314 that "The two images are too similar".

Marker selection 310 includes a user-selectable option to set a marker color. For instance, marker selection 310 includes a drop-down menu with multiple choices for a marker color, such as black, white, and red. User interface 300 includes marker selection 310 to set a marker color so that a trace of a user gesture superimposed on an image (e.g., first image 302), can be visually distinguished from content of the image.

Controls 312 can include any suitable control for collecting data of multimodal IERs. In the example in FIG. 3, controls 312 includes buttons to skip an image pair, record a voice command and user gesture, play a recorded voice command and user gesture, and play an instructional video. However, controls 312 may include other indicators and user-selectable options not shown in FIG. 3 for clarity.

Figure 4:
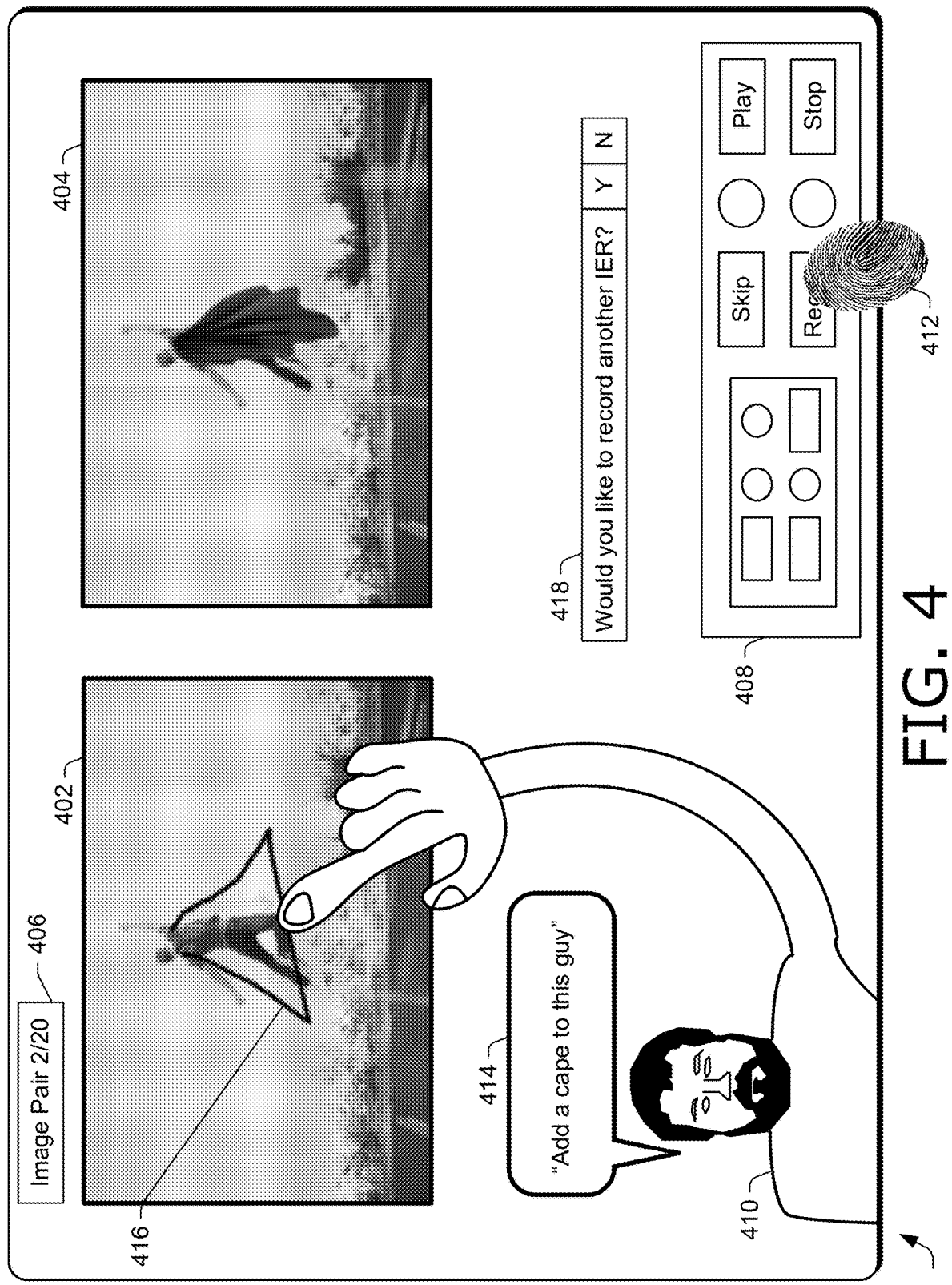
FIG. 4 illustrates an example user interface in accordance with one or more aspects of the disclosure.

FIG. 4 illustrates an example user interface 400 in accordance with one or more aspects of the disclosure. User interface 400 is an example of a user interface generated by user interface module 150 in FIG. 1 and FIG. 2. User interface 400 is an example of a user interface that may be exposed after a user enters a reason for skipping an image pair in user interface 300 of FIG. 3. Accordingly, user interface 400 in FIG. 4 exposes a different image pair than the image pair including first image 302 and second image 304 in FIG. 3. User interface 400 in FIG. 4 exposes an image pair including first image 402 and second image 404. User interface 400 also includes indicator 406 denoting that the image pair including first image 402 and second image 404 is a second of twenty image pairs (e.g., "2/20"), following the skipped image pair of FIG. 3, which was denoted as "1/20".

User interface 400 includes controls 408. Controls 408 is an example of controls 312 in FIG. 3, and can include any suitable control, option, menu, tab, and the like to configure user interface 400 and enter data via user interface 400. In the example in FIG. 4, user 410 operates user interface 400 and selects a "Record" option in controls 408, indicated by user selection 412. For instance, user selection 412 indicates a fingerprint to denote that user 410 has pressed a "Record" button of controls 408. User interface 400 may, in response to user selection 412, enable one or more microphones to receive a spoken utterance from user 410 that is recorded and stored, and enable one or more sensors (e.g., touchscreen sensors, cameras, mouse buttons, and the like) to receive a user gesture that is recorded and stored, such as by recording module 152 in FIG. 1, as described above.

User 410 simultaneously speaks voice command 414 while performing a user gesture indicated by trace 416, such as by tracing with a finger on a touchscreen displaying user interface 400. In the example in FIG. 4, second image 404 has been generated from first image 402 by adding a cape to the person in first image 402. Accordingly, user 410 performs a multimodal IER by speaking voice command 414 ("Add a cape to this guy") while simultaneously tracing a triangle shape representing a cape on the person in first image 402 (denoted by trace 416) to describe an edit of first image 402 used to generate second image 404.

User 410 can perform a user gesture in any suitable way, such as with a mouse, a touch on a touchscreen, a trackball, keys on a keyboard, moving a hand in front of a camera, enabling an optical sensor to track the user's eye movements, combinations thereof, and the like. A user gesture of a multimodal IER can trace any suitable shape, such as a circle, squiggle, box, point, unconstrained shape, combinations thereof, and the like. In the example in FIG. 4, user 410 touches a touchscreen and performs a user gesture in the shape of an item referenced in voice command 414, i.e., a cape, and draws trace 416 in the shape of a cape on first image 402.

User 410 can enter any suitable number of multimodal IERs for the image pair including first image 402 and second image 404. Accordingly, user interface 400 exposes menu option 418, such as when user 410 stops recording a multimodal IER by selecting a "Stop" button of controls 408, after a user transcribes a voice command, and the like. Menu option 418 prompts user 410 "Would you like to record another IER?", and includes an affirmative option denoted by Y for "yes" and a negative option denoted by N for "no". For instance, user 410 may wish to describe another edit of first image 402 than the addition of a cape used to generate second image 404, such as a color change, crop, and the like (not shown), and select the affirmative option of menu option 418.

Figure 5:
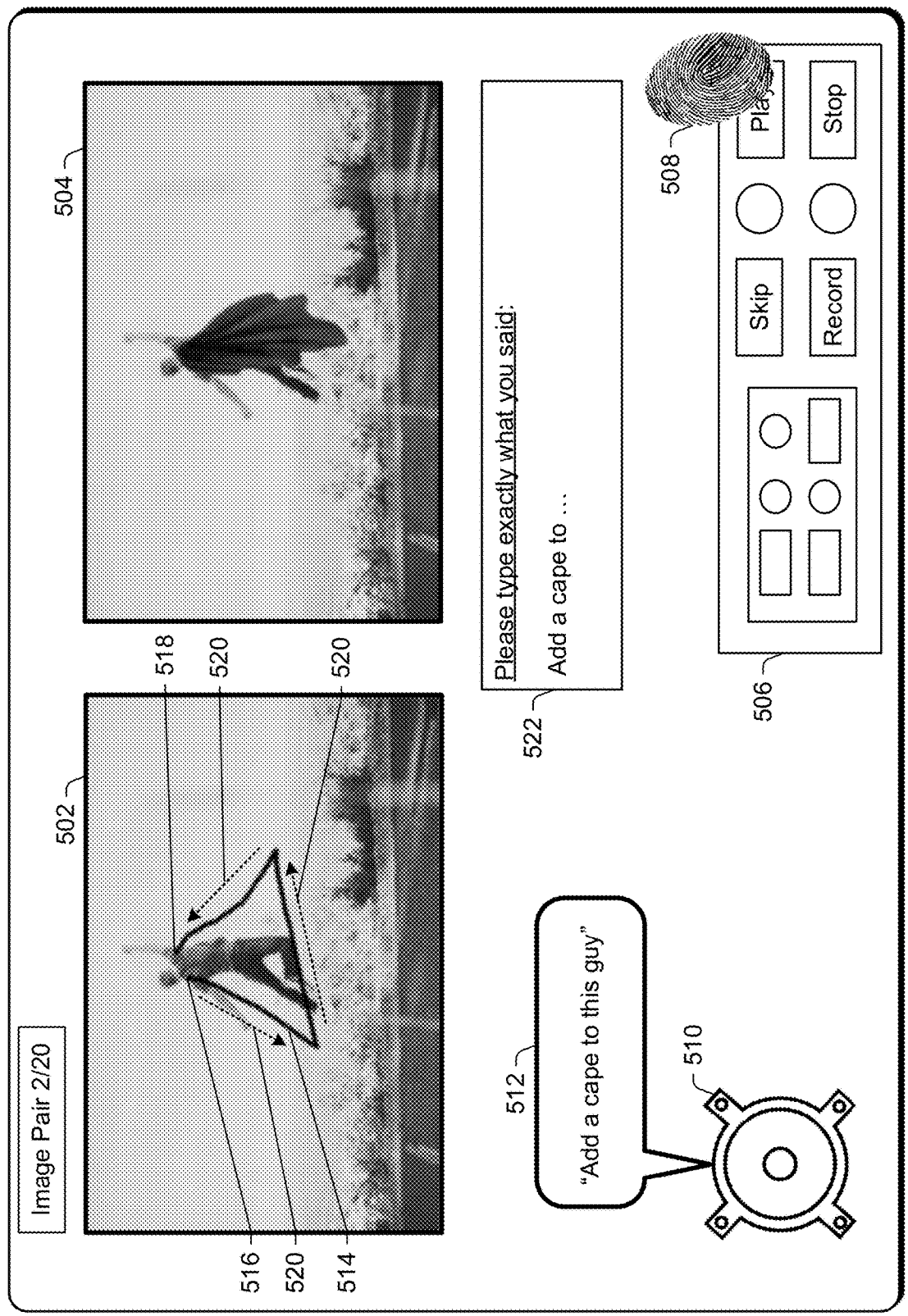
FIG. 5 illustrates an example user interface in accordance with one or more aspects of the disclosure.

FIG. 5 illustrates an example user interface 500 in accordance with one or more aspects of the disclosure. User interface 500 is an example of a user interface generated by user interface module 150 in FIG. 1 and FIG. 2. User interface 500 is an example of a user interface that may be exposed after a user has recorded a multimodal IER. Accordingly, user interface 500 in FIG. 5 exposes an image pair including first image 502 and second image 504, which are examples of first image 402 and second image 404 in FIG. 4, respectively. User interface 500 includes controls 506, which is an example of controls 408 in FIG. 4 and controls 312 in FIG. 3, and can include any suitable control, option, menu, tab, and the like to configure user interface 500 and enter data via user interface 500.

In the example in FIG. 5, a user selects a "Play" option in controls 506, indicated by user selection 508. For instance, user selection 508 indicates a fingerprint to denote that a user has pressed a "Play" button of controls 506. User interface 500, in response to user selection 508, may enable speaker 510 to play back a voice command (e.g., play back a recording of a voice command) For instance, a user may select an option in controls 506 to designate a recording of one or more voice commands for one or more respective multimodal IERs, and responsive to user selection 508, user interface 500 may play back a recording of a voice command for a multimodal IER designated by a user selection in controls 506. In one example, user interface 500 simultaneously traces a user gesture while playing back a recording of a voice command, the user gesture and the voice command corresponding to a same multimodal IER.

Responsive to user selection 508 in FIG. 5, speaker 510 plays back voice command 512 "Add a cape to this guy". Simultaneously, while voce command 512 is being played back, user interface 500 traces a user gesture corresponding to the voice command (e.g., made at a same time by a same user as the voice command), indicated by trace 514 in FIG. 5. In one example, a user may select via controls 506 to enable and disable playback of trace 514 when voice command 512 is played back.

To illustrate how trace 514 is exposed simultaneously with the play back of voice command 512, FIG. 5 denotes a starting point 516 of trace 514 and an ending point 518 of trace 514. For instance, trace 514 corresponds to a user gesture, such as a touch, starting at starting point 516 and ending at ending point 518 in a continuous fashion. This continuous exposure of trace 514 simultaneously with voice command 512 is illustrated with arrows 520. As an example, trace 514 is exposed at starting point 516 coinciding with the play back of the word "add" in voice command 512, and trace 514 is exposed at ending point 518 coinciding with the play back of the word "guy" in voice command 512. Arrows 520 indicate that trace 514 is drawn on first image 502 during playback of voice command 512 over speaker 510, by starting at starting point 516 at the beginning of voice command 512 and ending at ending point 518 at the end of voice command 512.

User interface 500 plays back trace 514 in a continuous fashion relative to voice command 512. In one example, a user gesture is a continuous gesture in which a user makes a smooth movement, such as swiping a touchscreen without lifting a finger from the touchscreen during movement. Additionally or alternatively, a user gesture includes a discrete gesture, such as a gesture formed by starting and stopping a touch gesture on a touchscreen, relocating a finger on a touchscreen, combinations thereof, and the like. User interface 500 plays back the user gesture by tracing the gesture on first image 502 smoothly and continuously, synchronized by timestamps recorded with the user gesture and voice command.

User interface 500 also exposes text box 522. In one example, text box 522 is exposed responsive to user selection 508. Text box 522 prompts a user to provide a transcription of voice command 512, and includes the instructions "Please type exactly what you said". In one example, the word "exactly" is emphasized (e.g., bold, italics, and the like) to direct a user to exactly transcribe their voice command A user can type a transcription of a voice command while the voice command is being played, e.g., while voice command 512 is being played through speaker 510. Controls 506 include an option (not shown) to replay a recording of a voice command Hence, a user may repeat playback of a recording of a voice command any suitable number of times to allow a user to transcribe the voice command. Accordingly, text box 522 in FIG. 5 includes the partial transcription "Add a cape to . . . " that is being entered by a user while a user listens to voice command 512 over speaker 510.

In one example, controls 506 includes a "Next" button (not shown) to proceed to a next image pair after a user transcription has been entered in text box 522. Additionally or alternatively, controls 506 may include an option (not shown) to enter another multimodal IER for the image pair exposed in user interface 500 (e.g., first image 502 and second image 504).

Having considered example user interfaces, consider now a discussion of example procedures for collecting multimodal IERs in accordance with one or more aspects of the disclosure.

Example Procedures

Figure 6:
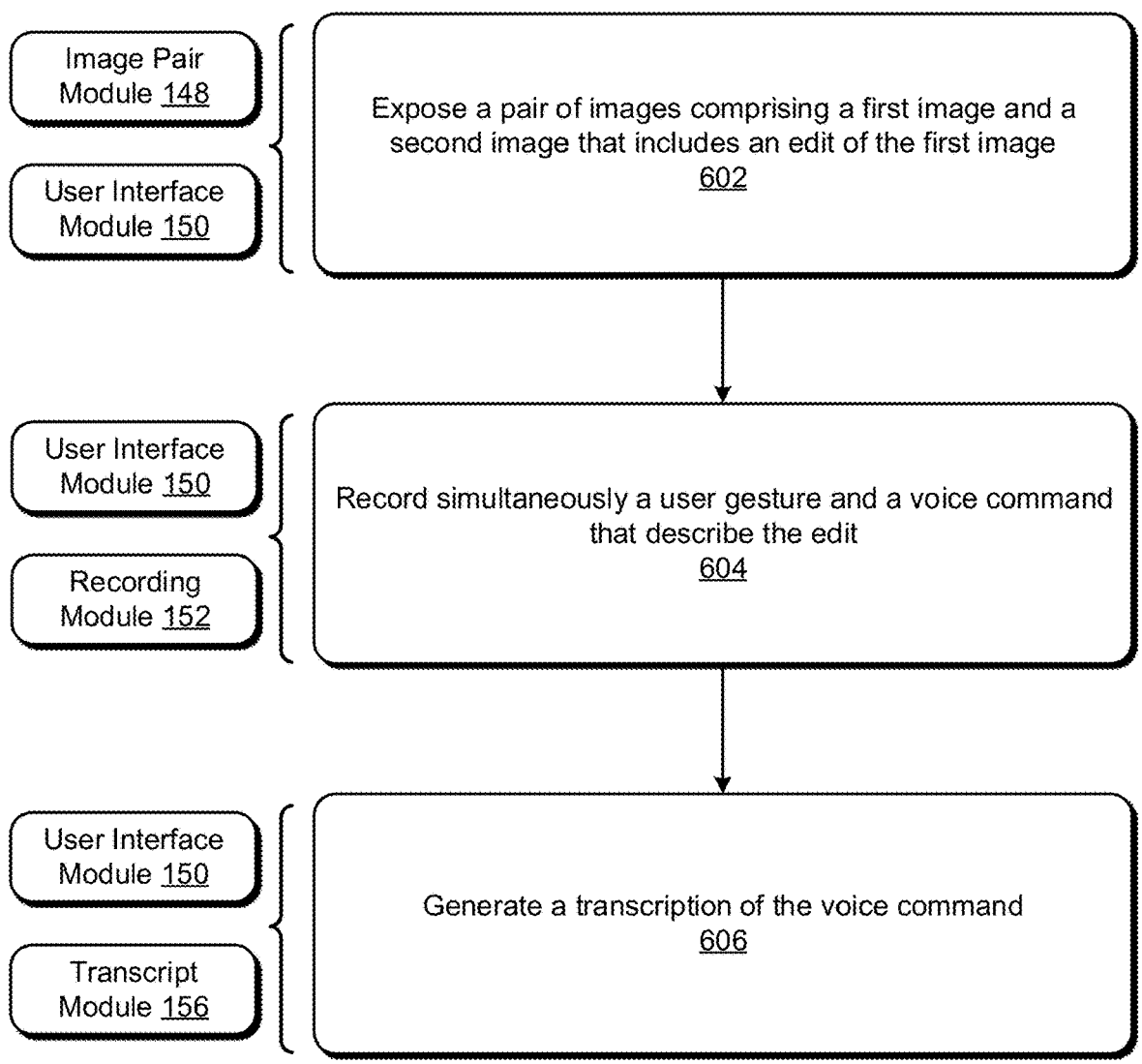
FIG. 6 illustrates a flow diagram depicting an example procedure in accordance with one or more aspects of the disclosure.

FIG. 6 illustrates an example procedure 600 for collecting multimodal IERs in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 118 of FIG. 1 that makes use of an IER collection system, such as system 200 in FIG. 2 or IER collection system 114 in FIG. 1. An IER collection system implementing procedure 600 may be an independent application that has been installed on the computing device, a service hosted by a service provider that is accessible by the computing device, a plug-in module to the computing device, or combinations thereof.

A pair of images comprising a first image and a second image that includes an edit of the first image is exposed (block 602). In one example, image pair module 148 obtains a pair of images and user interface module 150 exposes a pair of images comprising a first image and a second image that includes an edit of the first image.

A user gesture and a voice command that describe the edit are simultaneously recorded (block 604). In one example, recording module 152 records a user gesture and a voice command that describe the edit received via user interface module 150. Additionally or alternatively, the recording simultaneously the user gesture and the voice command includes recording a respective timestamp for each sample of the user gesture generated in the recording and each sample of the voice command generated in the recording.

In one example, each sample of the user gesture generated in the recording is represented as a tuple (e.g., a data tuple) including coordinates of the user gesture and said respective timestamp. Additionally or alternatively, the user gesture is recorded at a sample rate determined from a display refresh rate of a computing device.

A transcription of the voice command is generated (block 606). In one example, transcript module 156 generates a transcription (e.g., a text file) of the voice command via user input to a user interface of user interface module 150.

Additionally or alternatively, playback module 154 can play back the voice command from the recording, and the transcription can be generated based on the playing back the voice command. For instance, a user may listen to the recording of the voice command, replay the recording, and transcribe the voice command from the recording. The transcription and the voice command can be user generated by a same user while the pair of images are exposed by a client computing device on a user interface of user interface module 150. A representation of the user gesture (e.g., a trace of the user gesture) can be exposed simultaneously with the playing back the voice command, and synchronized during playback by timestamps captured in the recordings.

In one example, an indication of a hint for the edit is exposed, and a user selection of the indication is received. For instance, a user may select a "hint" button exposed in a user interface of user interface module 150. Responsive to receiving the user selection of the indication, the edit of the first image is indicated in the second image. As an example, an area where the edit is applied is emphasized, such as by shading, brightening, blinking, highlighting, bounding (e.g., with a bounding box, circle, ellipse, rectangle, etc.), combinations thereof, and the like. Additionally or alternatively, an option to skip the pair of images is presented, the option including a list of reasons for skipping the pair of images. In one example, a user must enter a reason for skipping an image pair to proceed to a different image pair.

Additionally or alternatively, the exposing, the recording, and the generating are repeated for a threshold number of image pairs. For instance, timing module 162 may enforce rules that require a threshold number of image pairs are exposed in a user session (while a user is logged in) so that the user is compensated, a user enter multimodal IERs for a threshold number of images, and the like.

In one example, a record of the user gesture from the recording, a record of the voice command from the recording, and the transcription are provided as training data to train a supervised machine learning algorithm, such as a neural network. For instance, packaging module 160 can package a record of the user gesture from the recording, a record of the voice command from the recording, and the transcription as a structured data object, and provide the structured data object to training module 124 of FIG. 1 to train an adaptive model, such as a neural network.

Figure 7:
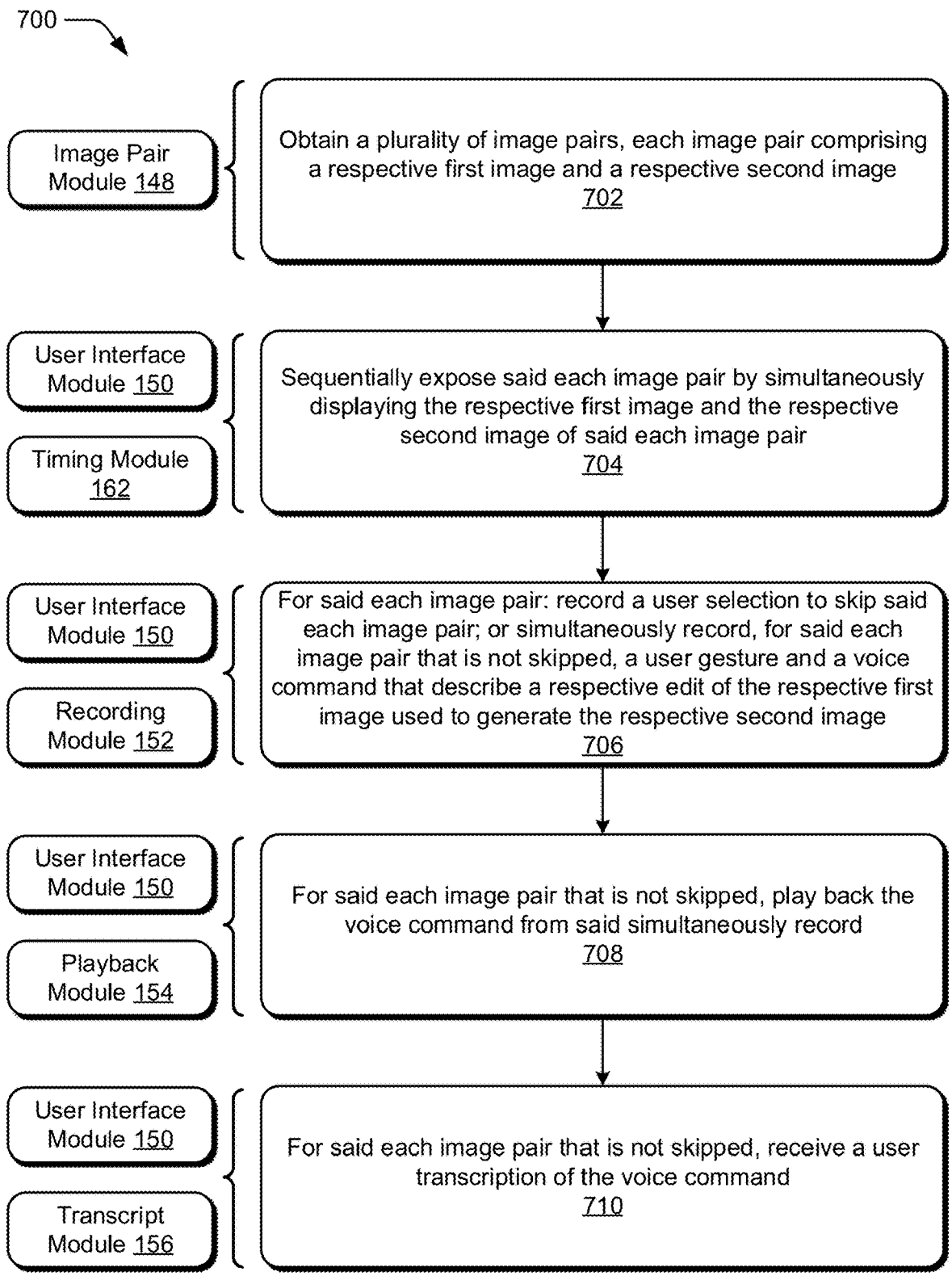
FIG. 7 illustrates a flow diagram depicting an example procedure in accordance with one or more aspects of the disclosure.

FIG. 7 illustrates an example procedure 700 for collecting multimodal IERs in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 118 of FIG. 1 that makes use of an IER collection system, such as system 200 in FIG. 2 or IER collection system 114 in FIG. 1. An IER collection system implementing procedure 700 may be an independent application that has been installed on the computing device, a service hosted by a service provider that is accessible by the computing device, a plug-in module to the computing device, or combinations thereof.

A plurality of image pairs is obtained. Each image pair includes a respective first image and a respective second image (block 702). In one example, image pair module 148 obtains a plurality of image pairs. For instance, image pair module 148 may obtain a plurality of image pairs from a database of server 118 in FIG. 1, such as structured database 122.

In one example, for at least one image pair of the plurality of image pairs, the respective second image is not generated by editing the respective first image. For instance, at least one image pair may be a placebo image pair.

Each image pair is sequentially exposed by simultaneously displaying the respective first image and the respective second image of said each image pair a (block 704). In one example, timing module 162 controls the order of image pairs that are simultaneously exposed on a user interface of user interface module 150.

For said each image pair, a user selection to skip said each image pair is recorded, or for said each image pair that is not skipped, a user gesture and a voice command that describe a respective edit of the respective first image used to generate the respective second image are simultaneously recorded (block 706). In one example, recording module 152 records a user selection to skip an image pair, and for each image pair that is not skipped, simultaneously records a user gesture and a voice command that describe a respective edit of the respective first image used to generate the respective second image.

In one example, to simultaneously record the user gesture and the voice command includes generating audio samples of the voice command asynchronously from coordinate data of the user gesture, and recording timestamps for the audio samples and timestamps for the coordinate data that can be used to synchronize a playing back of the user gesture with a playing back of the voice command.

For said each image pair that is not skipped, the voice command is played back from said simultaneously record (block 708). In one example, playback module 154 plays back, for said each image pair that is not skipped, the voice command from said simultaneously record.

For said each image pair that is not skipped, a user transcription of the voice command is received (block 710). For instance, a user may transcribe a voice command that is played back in user interface module 150, and transcript module 156 may generate a transcription (e.g., a text file of a user transcription) from data provided by user interface module 150.

Additionally or alternatively, a recording of the user gesture from said simultaneously record, a recording of the voice command from said simultaneously record, and the user transcription are packaged as a structured data object. For instance, packaging module 160 can package a recording of the user gesture from said simultaneously record, a recording of the voice command from said simultaneously record, and the user transcription as a structured data object. In one example, the structured data object includes metadata including at least one of a user identification, an identification of the computing device, and a length of time an IER collection system (e.g., IER collection system 114) is in use to collect the image editing requests.

In one example, a video is played providing user instruction for operating an IER collection system, the video including an example image pair, example image editing requests, instructions for skipping the example image pair, and instructions for accessing a hint describing the example image editing requests. For instance, instruction module 158 may play an instructional video.

Figure 8:
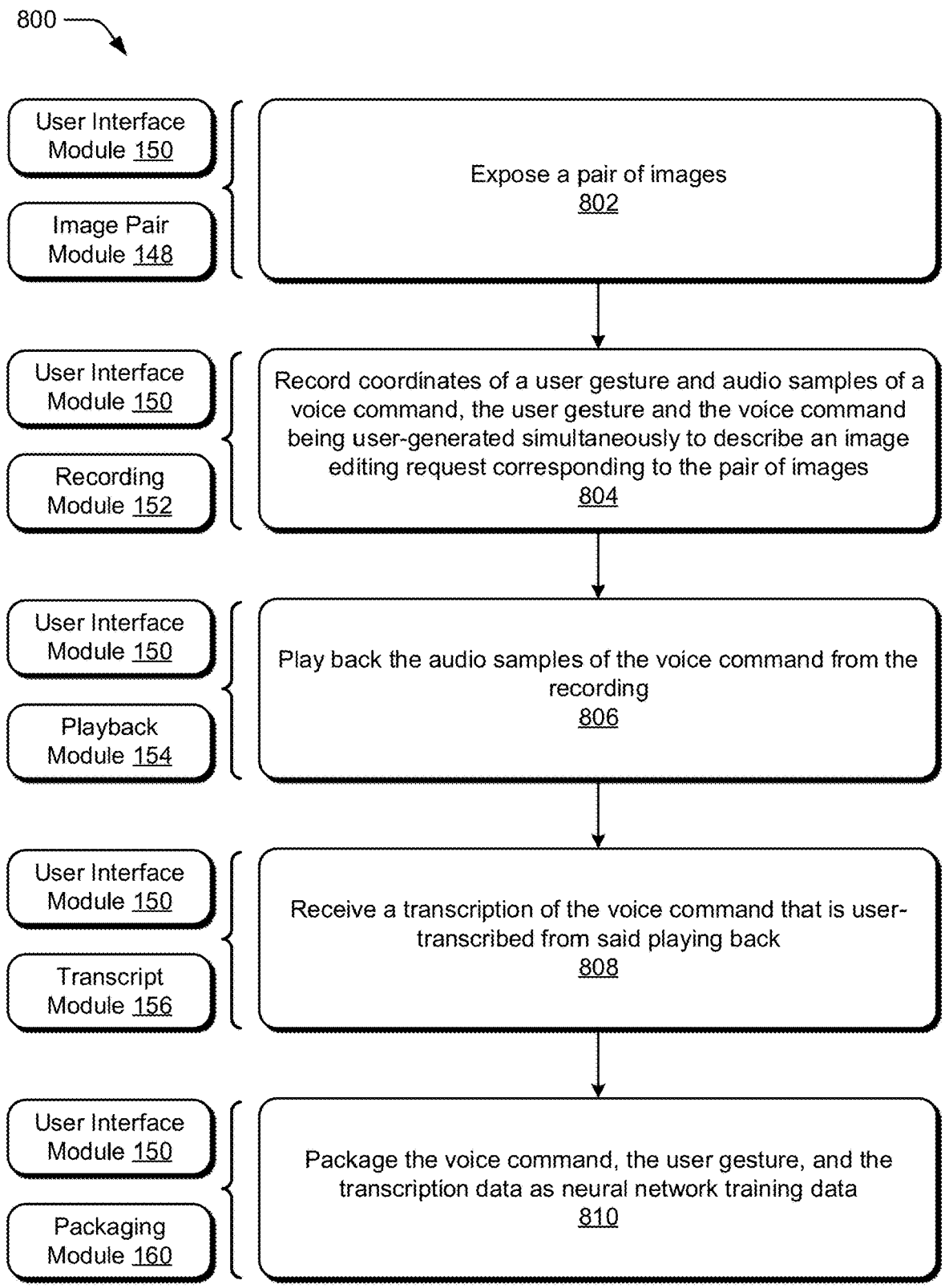
FIG. 8 illustrates a flow diagram depicting an example procedure in accordance with one or more aspects of the disclosure.

FIG. 8 illustrates an example procedure 800 for collecting multimodal IERs in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 118 of FIG. 1 that makes use of an IER collection system, such as system 200 in FIG. 2 or IER collection system 114 in FIG. 1. An IER collection system implementing procedure 800 may be an independent application that has been installed on the computing device, a service hosted by a service provider that is accessible by the computing device, a plug-in module to the computing device, or combinations thereof.

A pair of images is exposed (block 802). In one example, a pair of images is exposed in a user interface of user interface module 150.

Coordinates of a user gesture and audio samples of a voice command, are recorded (block 804). The user gesture and the voice command are user-generated simultaneously to describe an image editing request corresponding to the pair of images. In one example, recording module 152 records coordinates of a user gesture and audio samples of a voice command Coordinates of a user gesture can be represented as data tuples including the coordinates and timestamps of the coordinates.

The audio samples of the voice command are played back from the recording (block 806). In one example, playback module 154 plays back audio samples of the voice command are from the recording. Additionally or alternatively, playback module 154 can play back a user gesture by exposing a representation of the user gesture simultaneously with the playing back of the voice command. For instance, playback module 154 may expose a trace from coordinates of a user gesture.

A transcription of the voice command that is user-transcribed from said playing back is received (block 808). In one example, transcript module 156 generates a transcription of the voice command that is user-transcribed from said playing back, such as by generating a text file based on user gesture data obtained by a user interface of use interface module 150.

The voice command, the user gesture, and the transcription data are packaged as neural network training data (block 810). For instance, packaging module 160 may package the voice command, the user gesture, and the transcription data as a structured data object that can be used as training data to train an adaptive model, such as a neural network.

In one example, the step for recording, the step for playing back, the step for receiving, and the step for packaging are repeated for a plurality of user gestures and voice commands describing a respective plurality of image editing requests corresponding to the pair of images. Additionally or alternatively, the step for exposing, the step for recording, the step for playing back, the step for receiving, and the step for packaging can be repeated until a threshold number of pairs of images have been processed (e.g., number of image pairs exposed in a user interface, number of image pairs for which a user enters a multimodal IER, combinations thereof, and the like).

The procedures described herein constitute an improvement over procedures that do not collect data for multimodal IERs. Rather than relying on voice commands alone, or written IERs gleaned from websites offering image editing services, the procedures described herein collect multimodal IERs, including voice commands and user gestures performed simultaneously that describe an edit to an image. Furthermore, a same user who spoke a voice command can enter a transcription of the voice command, immediately after speaking the voice command by playing back a recording of the voice command a desired amount of times. Hence, the procedures described herein reduce a number of errors in transcriptions of voice commands compared to procedures where a different user than the user who spoke a voice command may transcribe a recording of a voice command. Accordingly, the procedures described herein collect multimodal IERs suitable to train an adaptive model, such as a neural network, machine learning algorithm, artificial intelligence model, and the like for use in recognizing multimodal IERs. Hence, an adaptive model trained with data collected by the procedures described herein can be implemented in an image editing application configured to accept multimodal IERs, significantly reducing the amount of user effort needed to edit images compared to image editing applications that do not accept multimodal IERs.

Having considered example procedures in accordance with one or more implementations, consider now example systems and devices that can be utilized to practice the inventive principles described herein.

Example Systems and Devices

Figure 9:
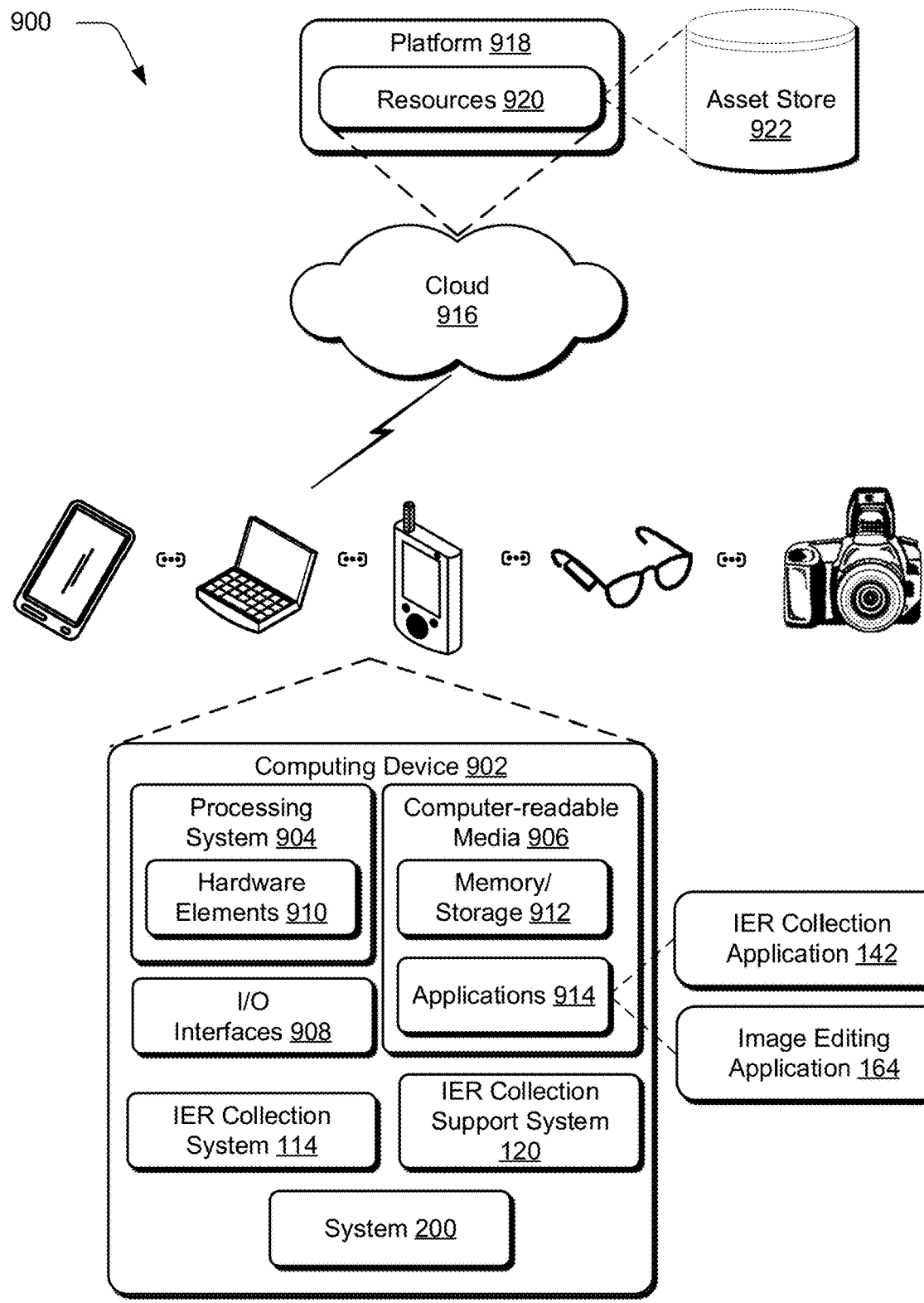
FIG. 9 illustrates an example system including various components of an example device that can be implemented

FIG. 9 illustrates an example system generally at 900 that includes an example computing device 902 that is representative of one or more computing systems and devices that may implement the various techniques described herein. This is illustrated through inclusion of IER collection system 114, system 200, IER collection application 146, image editing application 164, and IER collection support system 120, which operate as described above. Computing device 902 may be, for example, a user computing device (e.g., one of computing devices 104), or a server device of a service provider, (e.g., server 118). Furthermore, computing device 902 may include an on-chip system, multiple computing devices, combinations thereof, or any other suitable computing device or computing system. Accordingly, FIG. 9 illustrates computing device 902 as one or more of a tablet, a laptop computer, a smart phone, smart eye glasses, and a camera, though these examples are illustrative and in no way are meant to limit the type or number of devices included in computing device 902.

The example computing device 902 includes a processing system 904, one or more computer-readable media 906, and one or more I/O interfaces 908 that are communicatively coupled to each other. Although not shown, computing device 902 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 904 is representative of functionality to perform one or more operations using hardware. Accordingly, processing system 904 is illustrated as including hardware elements 910 that may be configured as processors, functional blocks, and so forth. This may include implementation in hardware as an application specific integrated circuit or other logic device formed using one or more semiconductors. Hardware elements 910 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 128 in FIG. 1 are an example of processing system 904.

Computer-readable storage media 906 is illustrated as including memory/storage 912. Storage 130 in FIG. 1 is an example of memory/storage included in memory/storage 912. Memory/storage component 912 may include volatile media (such as random access memory (RAM)), nonvolatile media (such as read only memory (ROM), Flash memory, optical disks, magnetic disks, and so forth), or combinations thereof. Memory/storage component 912 may include fixed media (e.g., RAM, ROM, a fixed hard drive, and so on) as well as removable media (e.g., Flash memory, a removable hard drive, an optical disc, and so forth). Computer-readable media 906 may be configured in a variety of other ways as further described below.

Input/output interface(s) 908 are representative of functionality to allow a user to enter commands and information to computing device 902 (e.g., multimodal IERs), and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, a touchscreen, and so forth. Thus, computing device 902 may be configured in a variety of ways as further described below to support user interaction.

Computing device 902 also includes applications 914. Applications 914 are representative of any suitable applications capable of running on computing device 902, and may include a web browser which is operable to access various kinds of web-based resources (e.g., assets, media clips, images, content, configuration files, services, user profiles, and the like). Applications 914 include IER collection application 146 and image editing application 164, as previously described. Furthermore, applications 914 includes any applications supporting IER collection system 114, system 200, and IER collection support system 120.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 902. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 910, or combinations thereof. Computing device 902 may be configured to implement particular instructions and functions corresponding to the software and hardware modules. Accordingly, implementation of a module that is executable by computing device 902 as software may be achieved at least partially in hardware, e.g., through use of computer-readable storage media and hardware elements 910 of processing system 904. The instructions and functions may be executable/operable by one or more articles of manufacture (for example, one or more computing devices 902 or processing systems 904) to implement techniques, modules, and examples described herein.

The techniques described herein may be supported by various configurations of computing device 902 and are not limited to the specific examples of the techniques described herein. This functionality may also be implemented all or in part through use of a distributed system, such as over a "cloud" 916 via a platform 918 as described below.

Cloud 916 includes and is representative of a platform 918 for resources 920. Platform 918 abstracts underlying functionality of hardware (e.g., servers) and software resources of cloud 916. Resources 920 may include applications, data, or applications and data that can be utilized while computer processing is executed on servers that are remote from computing device 902. Resources 920 can also include services provided over the Internet, through a subscriber network, such as a cellular or Wi-Fi network, or combinations thereof. Resources 920 can include asset store 922, which stores assets, such as digital images, image pairs including a respective first image which has been edited to form a respective second image, photographs (e.g., user images in a gallery, a database of stock photographs, search results including photographs, and the like), document templates, user profile data, user image libraries, such as photographs posted in a shared photo service, and the like, and may be accessed by computing device 902. Asset store 922 may also include adaptive models, such as neural networks, that have been trained using data of multimodal IERs collected with IER collection system 114, system 200, or combinations thereof.

Platform 918 may abstract resources and functions to connect computing device 902 with other computing devices. Platform 918 may also serve to abstract scaling of resources to provide a corresponding level of scale to encountered demand for resources 920 that are implemented via platform 918. Accordingly, in an interconnected device embodiment, implementation of functionality described herein may be distributed throughout system 1100. For example, the functionality may be implemented in part on computing device 902 as well as via platform 918 that abstracts the functionality of cloud 916.

CONCLUSION

In one or more implementations, a digital medium environment includes at least one computing device. Systems, techniques, and devices are described herein for collecting multimodal IERs including a voice command and a user gesture. A user interface is generated that exposes a pair of images including a first image and a second image that includes at least one edit to the first image. A user simultaneously speaks a voice command and performs a user gesture that describe an edit of the first image used to generate the second image. The user gesture and the voice command are simultaneously recorded and synchronized while being recorded with timestamps. The voice command is played back, and the user transcribes their voice command based on the play back, creating an exact transcription of their voice command A recording of the voice command, a recording of the user gesture (e.g., coordinates with respective timestamps), and a user transcription are packaged as a structured data object that can be used together with the pair of images as training data to train any suitable adaptive model to recognize multimodal IERs in an image editing application.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to create multimodal image editing requests, a method implemented by a computing device, the method comprising:
   displaying a pair of images including a first image and a second image that includes an edit of the first image;
   presenting an option to skip the pair of images, the option including that the first image and the second image are too similar;
   recording a multimodal image editing request that includes a user gesture and a voice command that describe the edit of the first image;
   receiving a user transcription of the voice command;
   generating a data object in a searchable format, the data object including the voice command, the user gesture, and the user transcription; and
   training a neural network to recognize the multimodal image editing requests using the data object and the first image as inputs of the neural network and the second image as an output of the neural network.

2. The method as described in claim 1, further comprising playing back the voice command from the recording, wherein the user transcription is generated by a same user who spoke the voice command based on the playing back the voice command.

3. The method as described in claim 2, further comprising displaying a representation of the user gesture simultaneously with the playing back the voice command.

4. The method as described in claim 1, further comprising:
   displaying a hint for the edit;
   receiving a user selection of the hint; and
   indicating in the second image, responsive to the receiving the user selection of the hint, the edit of the first image.

5. The method as described in claim 1, further comprising repeating the displaying, the presenting, the recording, and the receiving the user transcription for a threshold number of image pairs for user compensation for the user gesture, the voice command, and the user transcription of the image pairs.

6. The method as described in claim 1, wherein the recording the user gesture and the voice command includes recording a respective timestamp for each sample of the user gesture generated in the recording and each sample of the voice command generated in the recording.

7. The method as described in claim 6, wherein samples of the user gesture generated in the recording are represented as data tuples including coordinates of the user gesture and the respective timestamp.

8. A system for creating multimodal image editing requests implemented by a computing device in a digital medium environment, the system comprising:
   a memory to maintain a plurality of image pairs, each image pair including a first image and a second image, the second image having been generated from the first image with an edit of the first image, at least one image pair of the plurality of the image pairs being a placebo image pair used to remove user bias, the placebo image pair having the respective second image that is not generated based on an edit of the respective first image;
   a user interface to sequentially display the plurality of the image pairs by displaying together the respective first image and second image of each image pair;

a processor system to implement an editing request creation application at least partially in hardware of the computing device, and for each of the image pairs, the editing request creation application is configured to:
record a multimodal image editing request that includes a user gesture and a voice command that describe the edit of the first image;
initiate play back of the voice command to generate a user transcription of the voice command;
generate a data object in a searchable format, the data object including the voice command, the user gesture, and the user transcription; and
train a neural network to recognize the multimodal image editing requests using the data object and the respective first image as inputs of the neural network and the respective second image as an output of the neural network.

9. The system as described in claim 8, wherein the editing request creation application is implemented to generate the data object to include metadata including a user identification, an identification of the computing device, and a length of time the system is in use to create the multimodal image editing requests.

10. The system as described in claim 8, wherein the editing request creation application is implemented to:
generate audio samples of the voice command asynchronously from coordinate data of the user gesture; and
record timestamps for the audio samples and timestamps for the coordinate data that can be used to synchronize a playing back of the user gesture with a playing back of the voice command.

11. The system as described in claim 8, wherein the editing request creation application is implemented to:
compare a threshold time to a time duration between user logins to the system; and
automatically play, based on the compare, a video providing user instruction for operating the system, the video including an example image pair, example image editing requests, instructions for skipping the example image pair, and instructions for accessing a hint describing the example image editing requests.

12. In a digital medium environment to create multimodal image editing requests, a method implemented by a computing device, the method comprising:
displaying a pair of images;
a step for recording coordinates of a user gesture and audio samples of a voice command, the user gesture and the voice command representing a multimodal image editing request corresponding to the pair of images;
a step for playing back the audio samples of the voice command from the recording;
a step for receiving a transcription of the voice command that is user-transcribed from the playing back;
a step for enabling, responsive to the receiving the transcription, display of a subsequent pair of images;
a step for generating a data object in a searchable format, the data object including the voice command, the user gesture, and the transcription; and
a step for training a neural network to recognize the multimodal image editing requests using the data object and a first image of the pair of images as inputs of the neural network and a second image of the pair of images as an output of the neural network.

13. The method as described in claim 12, wherein the step for the recording, the step for the playing back, the step for the receiving, the step for enabling, the step for the generating, and the step for the training are repeated for a plurality of user gestures and voice commands representing a respective plurality of multimodal image editing requests corresponding to the pair of images.

14. The method as described in claim 1, wherein the user gesture is in a shape of an item referenced in the voice command and corresponding to the edit of the first image.

15. The method as described in claim 1, further comprising:
receiving a user selection that indicates no more multimodal image editing requests to enter for the pair of images; and
displaying, responsive to the receiving the user selection, an additional pair of images including an additional first image and an additional second image that includes an additional edit of the additional first image.

16. The method as described in claim 4, further comprising determining an additional pair of images to display based on the receiving the user selection of the hint, the additional pair of images including an additional first image and an additional second image that includes a same type of edit as the edit of the first image.

17. The system as described in claim 8, wherein the editing request creation application is implemented to receive the user transcription corresponding to a first one of the image pairs to enable the display of a subsequent one of the image pairs in the user interface.

18. The method as described in claim 12, further comprising:
a step for initiating a timer once the recording is completed; and
wherein the step for playing back the audio samples is responsive to an expiration of the timer.

19. The method as described in claim 1, further comprising displaying a placebo image pair used to remove user bias, the placebo image pair including an additional second image that is not generated based on an edit of an additional first image included in the placebo image pair.

20. The method as described in claim 12, further comprising a step for displaying a placebo image pair used to remove user bias, the placebo image pair including an additional second image that is not generated based on an edit of an additional first image included in the placebo image pair.

* * * * *